(12) United States Patent
Hashimoto et al.

(10) Patent No.: US 6,244,963 B1
(45) Date of Patent: Jun. 12, 2001

(54) DAMPENING DISK ASSEMBLY

(75) Inventors: Hideki Hashimoto, Katano; Takashi Harada; Keisuke Fujioka, both of Shijonawate, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/291,966

(22) Filed: Apr. 15, 1999

(30) Foreign Application Priority Data

Apr. 17, 1998 (JP) .................................................. 10-108349

(51) Int. Cl.⁷ .............................. F16D 3/14; F16D 13/64
(52) U.S. Cl. ........................................ 464/68; 192/213.22
(58) Field of Search .................................. 464/68, 66, 64, 464/83, 67; 192/213.2, 213.21, 213.22

(56) References Cited

U.S. PATENT DOCUMENTS

| | | |
|---|---|---|
| 4,560,054 | 12/1985 | Kayanoki et al. . |
| 4,577,742 | 3/1986 | Saida . |
| 4,585,428 | 4/1986 | Asada . |
| 4,586,595 | 5/1986 | Hartig et al. . |
| 4,643,288 | 2/1987 | Tomm et al. . |
| 4,669,595 | 6/1987 | Fischer et al. . |
| 4,684,007 | 8/1987 | Maucher . |
| 4,899,862 | * 2/1990 | Graton et al. .......................... 464/68 |
| 4,966,269 | 10/1990 | Raab et al. . |
| 4,998,608 | 3/1991 | Raab et al. . |
| 5,000,304 | * 3/1991 | Kock et al. ............................. 464/38 |
| 5,238,096 | 8/1993 | Ament et al. . |
| 5,240,458 | * 8/1993 | Linglain et al. ........................ 464/63 |
| 5,246,398 | 9/1993 | Birk et al. . |
| 5,595,276 | * 1/1997 | Memmel ......................... 192/213.12 |
| 5,769,199 | * 6/1998 | Lohaus ............................ 192/213.21 |
| 5,771,999 | * 6/1998 | Kleifges et al. ........................ 464/68 |
| 5,829,567 | * 11/1998 | Ament ................................ 192/213.2 |
| 5,893,446 | 4/1999 | Honjo et al. . |
| 6,016,899 | * 1/2000 | Ament ..................................... 464/68 |
| 6,056,103 | * 5/2000 | Hashimoto et al. ................... 464/68 |

* cited by examiner

Primary Examiner—Lynne H. Browne
Assistant Examiner—Kenneth Thompson
(74) Attorney, Agent, or Firm—Shinjyu Global IP Counselors, LLP

(57) ABSTRACT

A dampening disk assembly is provided with a dampening mechanism 108. The dampening mechanism 108 has a simplified structure with a spring and a friction generating mechanism, which provides a characteristic of a first step in a separated hub type dampening disk assembly. The dampening disk assembly is also provided with an output hub 104, a pair of input plates 112 and 113, an intermediate plate 109 and a first elastic member 106. The intermediate plate 109 is disposed between the pair of input plates 112 and 113. The first elastic member 106 couples the pair of input plates 112 and 113 and the intermediate plate 109 elastically in a rotary direction. The output hub 104 is disposed on an inner circumferential side of the pair of input plates 112 and 113 and the intermediate plate 109. The dampening mechanism 108 couples the output hub 104 and the intermediate plate 109 elastically in a rotary direction, and includes a first and second portion 131 and 130 and an elastic portion 107. The first portion 131 is connected with an outer circumference of the output hub 104 in a relatively non-rotatably but axially movable manner. The first portion 131 includes a first friction face and a first supporting part 164. The second portion 130 is connected with the intermediate plate 109 relatively in a non-rotatable manner. The second portion 103 includes a second friction face which contacts the first friction face, and a second supporting part 168 corresponding to the first supporting part 164. The rotationally end part of the elastic portion 107 is supported by the first and second supporting parts 164 and 168 and couples the first and second portions 131 and 130 in a rotary direction.

10 Claims, 25 Drawing Sheets

DAMPENING DISK ASSEMBLY

BACKGROUND OF THE INVENTION

1. Field of the Invention

This invention generally relates to a dampening disk assembly. More specifically, the present invention relates to a separated hub type dampening disk assembly.

2. Background Information

A clutch disk assembly or dampening disk assembly used for a clutch of a car has a clutch function of coupling and/or uncoupling a flywheel of the engine to the transmission shaft, and a dampening function of absorbing and dampening torsion vibrations transmitted from the flywheel. The clutch disk assembly basically includes a clutch disk, a pair of input plates, a hub and an elastic portion. The pair of input plates are fixedly coupled to the clutch disk. The hub is disposed on the inner circumferential side of the input plate. The elastic portion elastically couples the hub and the input plates together for movement in a rotary direction. The elastic portion is disposed between the input plates and the hub, and is compressed in a rotary direction when the input plate rotates relatively against the hub. When the clutch disk assembly is coupled with the flywheel, a torque is inputted to the input plates of the clutch disk assembly from the flywheel. The torque is transmitted to the hub via the elastic portion, and then is outputted to a shaft extending from a transmission. When a torque fluctuation is input to the clutch disk assembly from an engine, a relative rotation is caused between the pair of input plates and the hub, and the elastic portion is compressed repeatedly in a circular direction.

In addition, the clutch disk assembly has a friction mechanism. The friction mechanism is disposed between the input plate and the hub, and generates a friction resistance when both portions rotate relatively. The friction mechanism includes a plurality of washers and urging portions.

A separated hub type clutch disk assembly has a hub flange (separated flange) in which a conventional flange of a hub is separated from a boss, in addition the separated hub type clutch disk assembly has the boss and the hub flange both of which are coupled in a rotary direction by an elastic portion with a low rigidity. This clutch disk assembly has a large torsion angle between an input plate and the hub, in addition provides a rigidity of two steps (low rigidity-high rigidity).

The conventional separated hub type clutch disk assembly mentioned above includes, for example, a small friction mechanism formed between a retaining plate (one of a pair of input plates) and the boss of the hub, and a large friction mechanism formed between the retaining plate and the hub flange. The large friction mechanism includes a first friction portion which touches the hub flange and is connected with the retaining plate relatively unrotatably and axially movably, and a first urging portion which is disposed between the first friction portion and the retaining plate and urges the first friction portion against the hub flange side. The small friction mechanism includes a second friction portion which touches the flange of the hub and is connected with the retaining plate relatively unrotatably and axially movably, and a second urging portion which is disposed between the second friction portions and the retaining plate and urges the second friction portion against the flange side. In general, the first friction portion is set to have a friction coefficient larger than that of the second friction portion, and the first urging portion is set to have an urging force larger than that of the second urging portion. Therefore, the large friction mechanism generates a larger friction (high hysteresis torque) compared with the small friction mechanism.

Within a range of a torsion angle of the first step in which the hub flange and the hub rotate relatively, the elastic portion with a low rigidity is compressed, and the second friction portion of the small friction mechanism rubs the flange of the boss, resulting in a characteristic of low rigidity-low hysteresis torque. After the hub flange starts rotating together with the boss in a body, a relative rotation between the hub flange and a pair of input plates is caused. Within a range of this second step, an elastic portion with a high rigidity is compressed between the hub flange and a pair of input plates, and the second friction portion of the large friction mechanism rubs the hub flange, resulting in a characteristic of high rigidity-high hysteresis torque.

In the conventional separated flange type clutch disk assembly mentioned above, a coil spring as the elastic portion with a low rigidity is disposed within a concave part which is formed around external teeth of the hub and internal teeth of the separated flange. The friction mechanism of the first step includes the friction portion that rotates together with the retaining plate in a body and is disposed axially movably, and the urging portion, which is disposed between the friction portion and the retaining plate. The urging portion is compressed between the friction portion and the retaining plate in an axial direction, and urges the friction portion toward the flange side. In this clutch disk assembly, a predetermined cutout in which the spring is disposed has to be formed at the hub and the separated flange. In addition, a formation of the cutout result in a reduction of the number of the external teeth of the hub and the internal teeth of the separated flange. In other words, an area which both portions touch decreases and a bearing stress decreases. Consequently, a possibility of an abrasion and damage of both external and internal teeth increases.

In view of the above, there exists a need for a dampening disk assembly which overcomes the above mentioned problems in the prior art. This invention addresses this need in the prior art as well as other needs, which will become apparent to those skilled in the art from this disclosure.

SUMMARY OF THE INVENTION

An object of the present invention is to simplify the structure of the spring and the friction generating mechanism which provide the characteristic of the first step in the separated hub type dampening disk assembly.

In accordance with one aspect of the present invention, a dampening disk assembly is provided, which includes a pair of input plates, an intermediate plate, a first elastic portion and a dampening mechanism. The intermediate plate is disposed between the pair of input plates. The first elastic portion couples the pair of input plates and the intermediate plate elastically in a rotary direction. The output hub is disposed on an inner circumferential side of the pair of input plates and the intermediate plate. The dampening mechanism couples the output hub and the intermediate plate elastically in a rotary direction, and includes first and second portions and an elastic portion. The first portion is connected with an outer circumference of the output hub in a relatively non-rotatably but axially movable manner. The first portion includes a first friction face and a first supporting part. The second portion is connected with the intermediate plate relatively in a non-rotatable manner. The second portion includes a second friction face which is able to touch the first friction face, and a second supporting part corresponding to the first supporting part. The rotationally end part of the elastic portion is supported by the first and second supporting parts and couples the first and second portions in a rotary direction.

In accordance, with another aspect of the present invention, when a torque is inputted to the pair of input plates of the dampening disk assembly, the torque is transmitted to the intermediate plate via the first elastic portion. The torque is then transmitted from the intermediate plate to the output hub via the dampening mechanism. Within the dampening mechanism, the torque is transmitted from the second portion to the first portion via the elastic portion.

Within a range of a small torsion angle of the first step, the intermediate plate and the output hub rotate relatively, and the second elastic portion is compressed between the first and second portions in a rotary direction. At that time both friction faces of the first and second portions rub each other, resulting in a generation of a predetermined hysteresis torque.

Since the second elastic portion is supported not by the conventional hub and intermediate plate, but by the first and second portions, the simple structure can be provided by using a portion which is easy to manufacture. In addition, in this dampening disk assembly, the friction face is formed between the first and second portions, resulting in a reduction of the number of parts.

Preferably, the first portion has an annular resin main body. Moreover, the first portion preferably supports an axially inside part of the second elastic portion. The first supporting part is a concave part formed at the resin main body. The first supporting part has an inner circumferential side supporting part to support an inner circumferential side of the second elastic portion. The first portion has a protrusion which projects toward the flange side and connects with the flange relatively unrotatably and axially movably.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
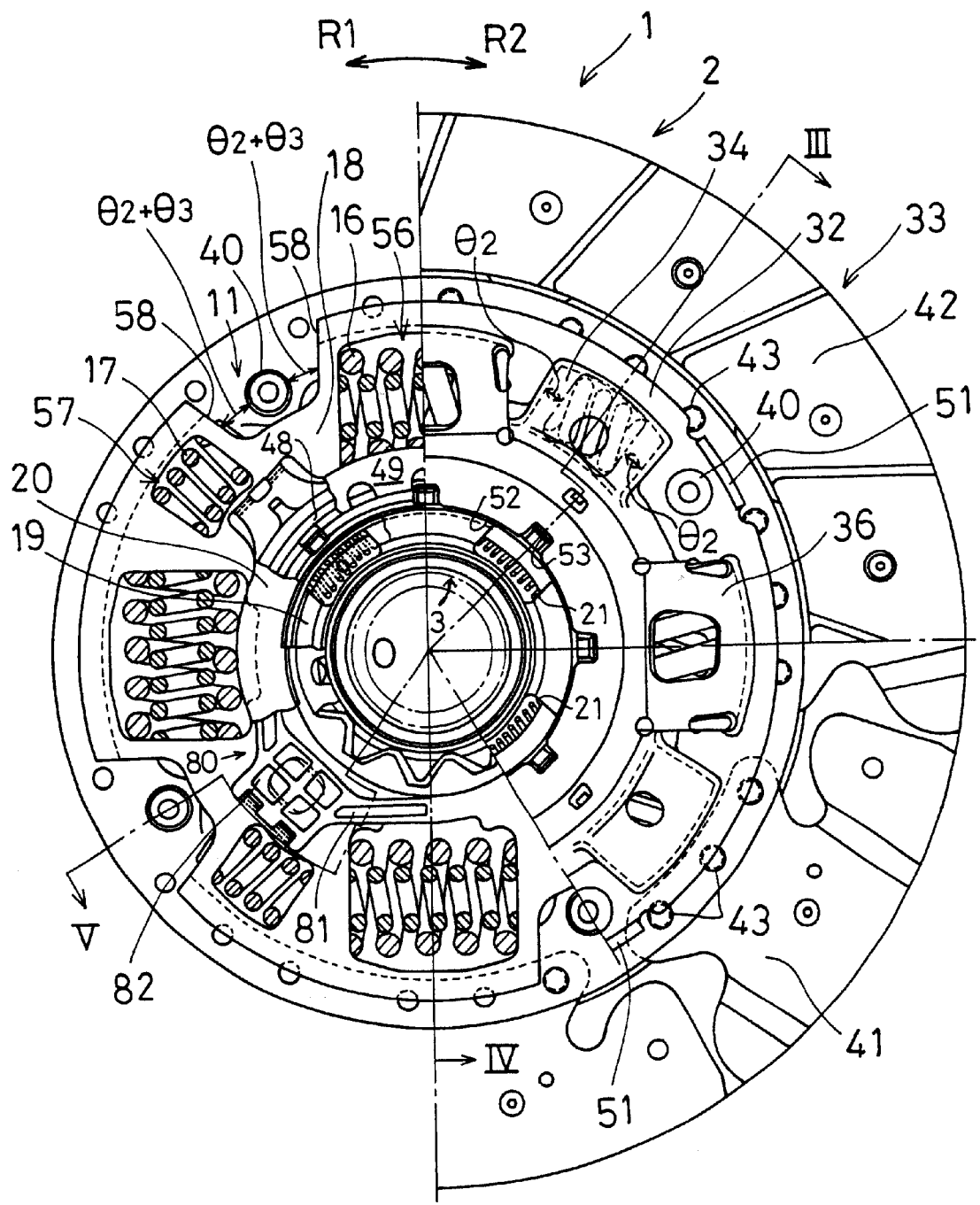
FIG. 1 is a partial side elevational view of a clutch disk assembly in accordance with an embodiment of the present invention with portions broken away for purposes of illustration.
Figure 2:
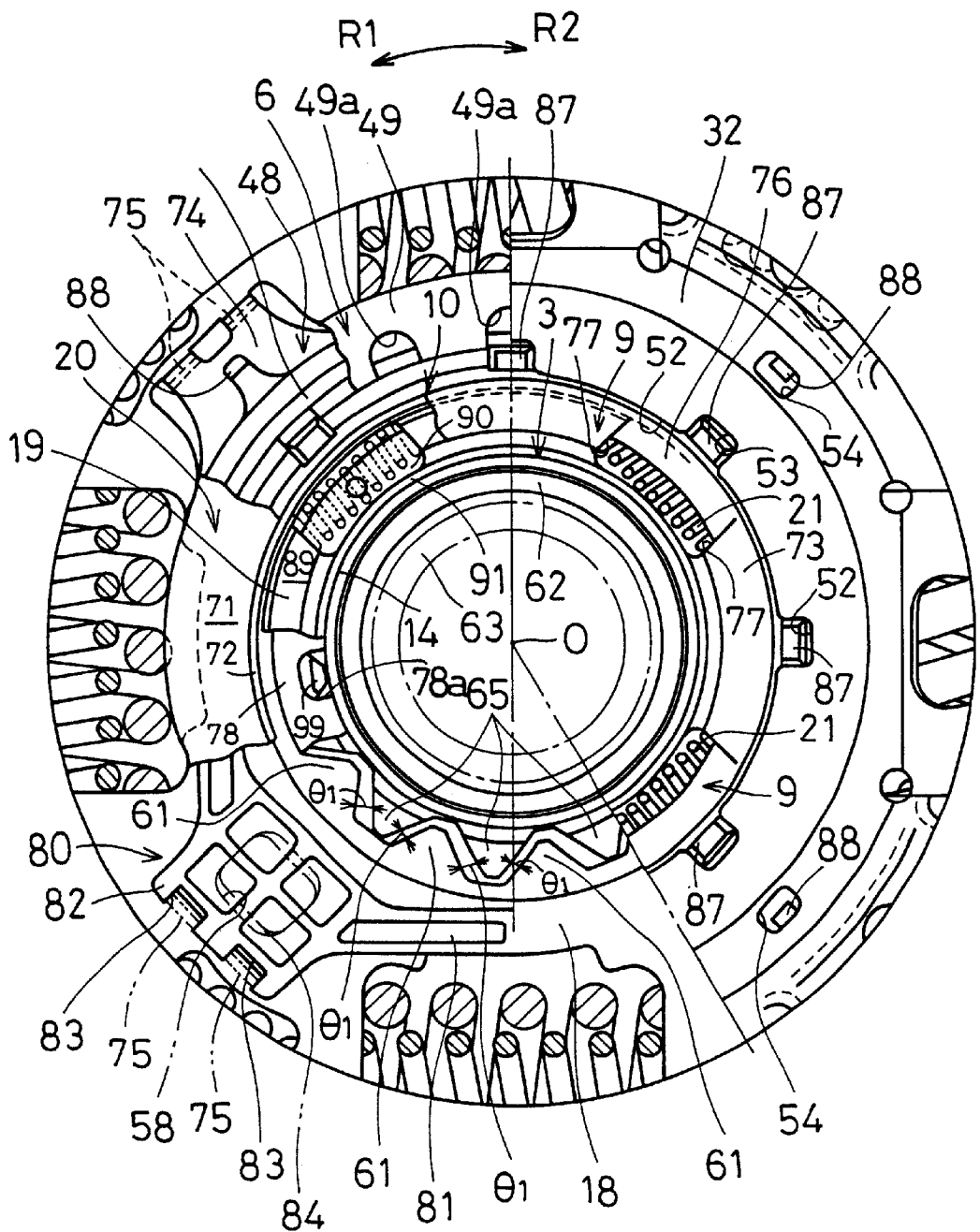
FIG. 2 is an enlarged partial side elevational view of a part of the clutch disk assembly illustrated in FIG. 1 with portions broken away for purposes of illustration.
Figure 3:
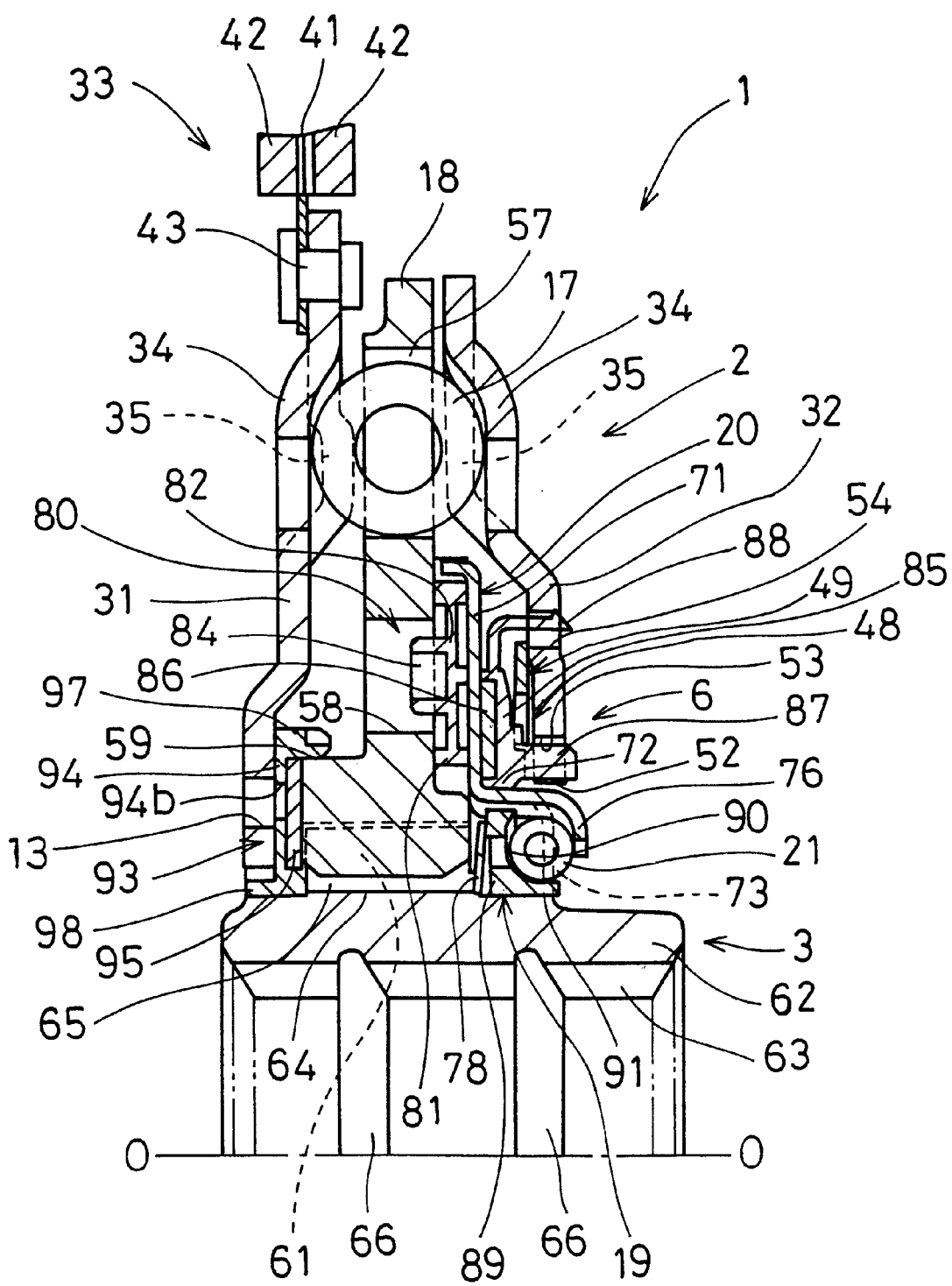
FIG. 3 is an enlarged partial cross sectional view of a part of the clutch disk assembly illustrated in FIG. 1 as viewed along section line O–III of FIG. 1.
Figure 4:
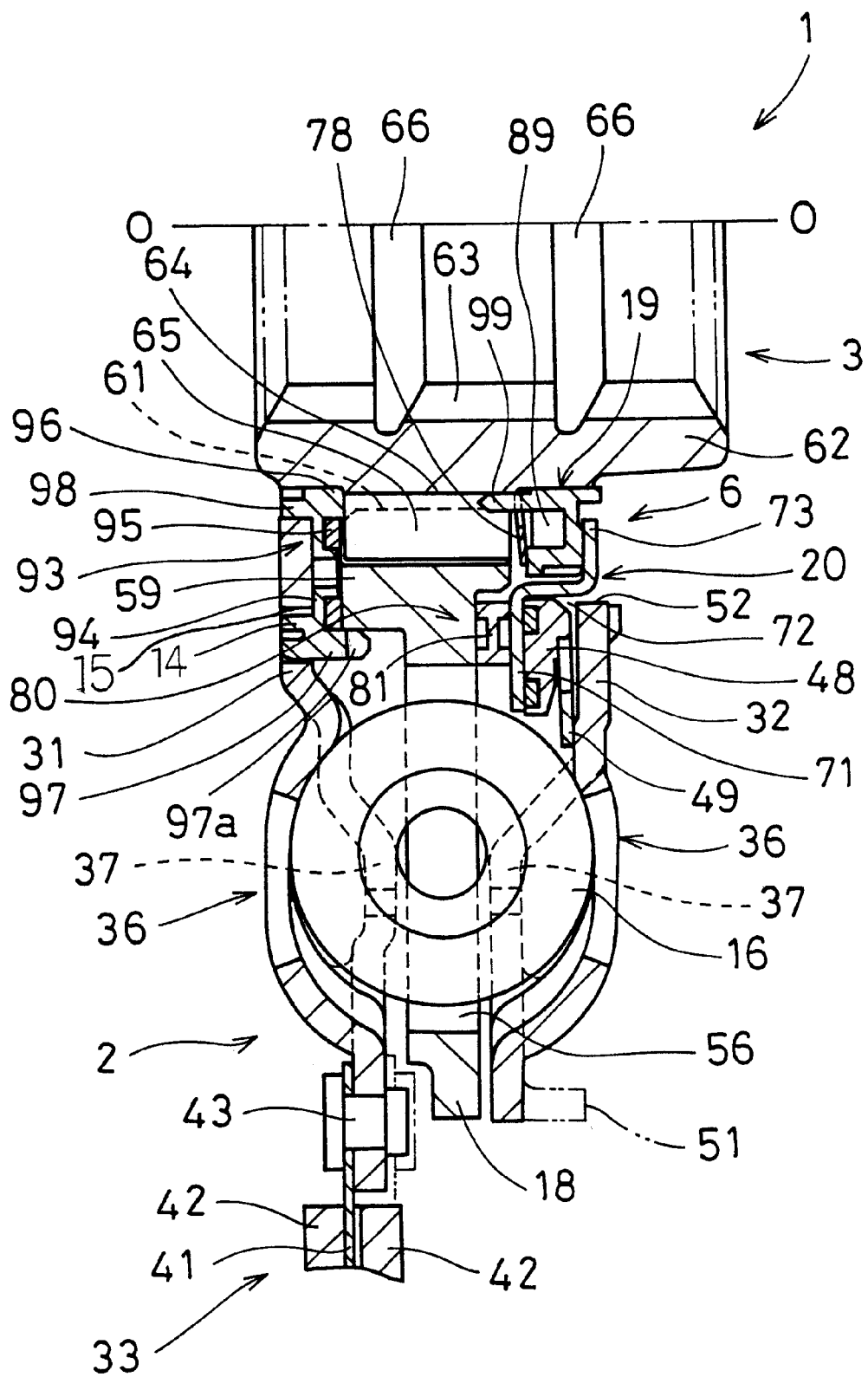
FIG. 4 is an enlarged partial cross sectional view of a part of the clutch disk assembly illustrated in FIG. 1 as viewed along section line O–IV of FIG. 1.
Figure 5:
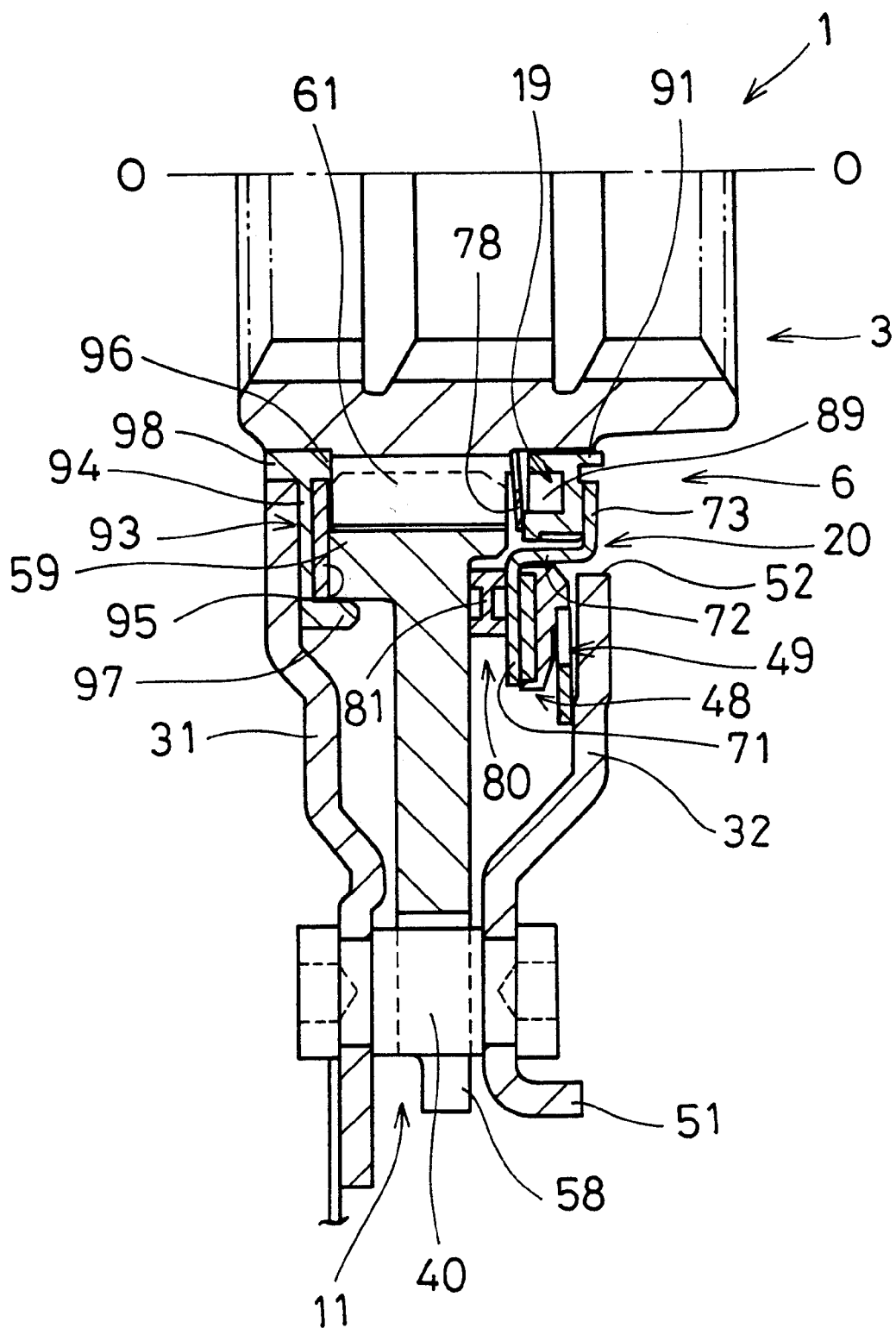
FIG. 5 is an enlarged partial cross sectional view of a part of the clutch disk assembly illustrated in FIG. 1 as viewed along section line O–V of FIG. 1.

Referring initially to FIGS. 1 to 5, a clutch disk assembly 1 is illustrated in accordance with a first embodiment of the present invention. The clutch disk assembly 1 is used for a clutch of a car or other motorized vehicle. On the left side of the clutch disk assembly as viewed in FIGS. 3 to 5, an engine and a flywheel (not shown in Figures) are located, and on the right side as viewed in FIGS. 3 to 5, a transmission (not shown in Figures) is located. Hereafter, the left side as viewed in FIGS. 3 to 5 is referred as a first axis side (engine side), and the right side as viewed in FIGS. 3 to 5 is referred as a second axis side (transmission side). The centerline O—O in each of the drawings represents an axis of rotation or a center of rotation of the clutch disk assembly 1. As shown in FIGS. 1 and 2, an arrow R1 indicates a first rotational direction (positive direction) of the flywheel and the clutch disk assembly 1, while an arrow R2 indicates its opposite rotational direction (negative direction).

Figure 6:
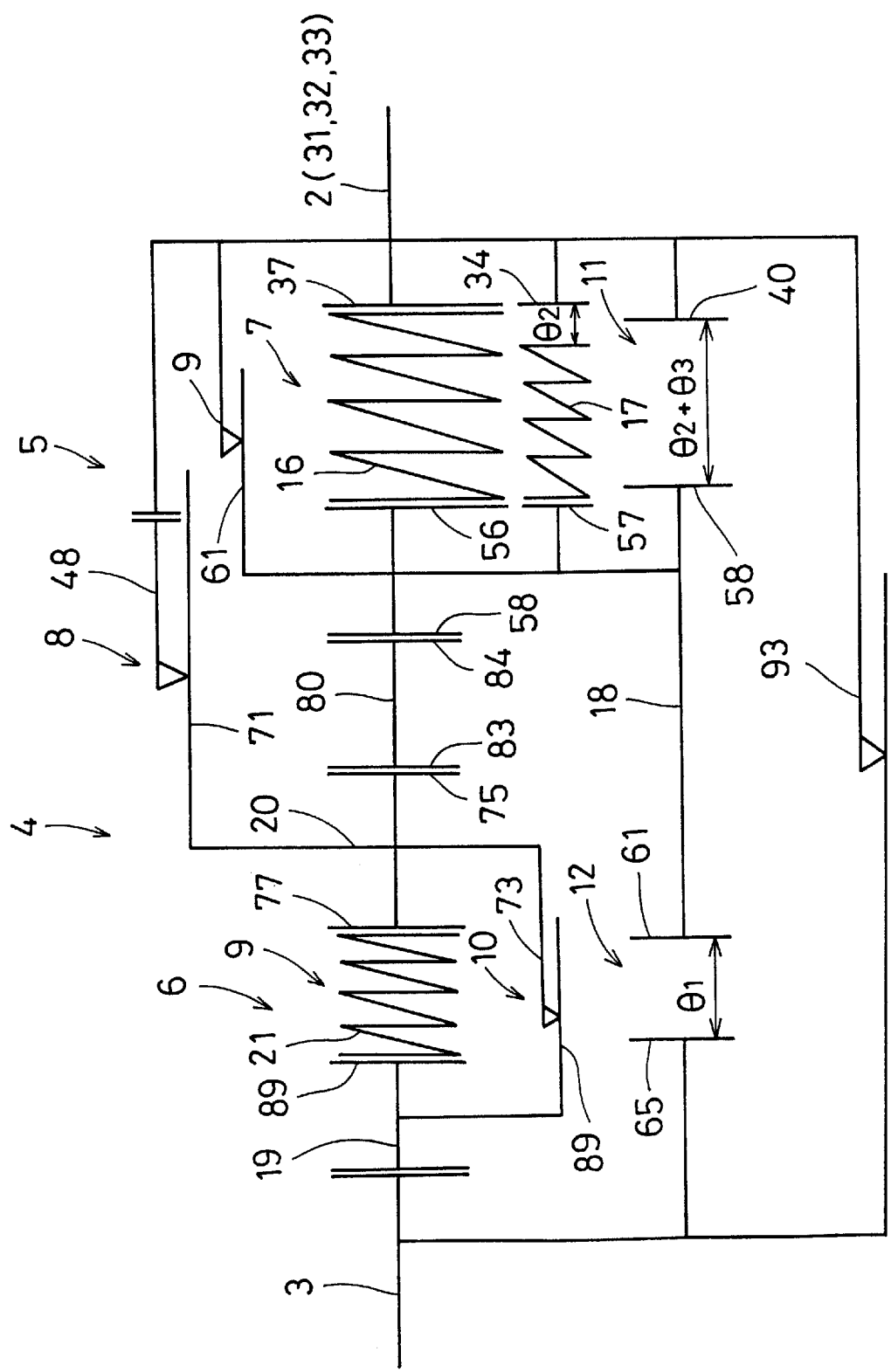
FIG. 6 is a diagrammatic machine circuit drawing of a dampening mechanism utilizing the clutch disk assembly in accordance with the present invention.

A clutch disk assembly 1, as shown in a machine circuit diagram of FIG. 6, mainly includes an input rotary portion 2, a hub or output rotary portion 3, and a dampening mechanism 4 disposed between the input rotary portion 2 and the hub 3. The dampening mechanism 4 includes a first dampening mechanism 5 with a characteristic of a torsion angle of a second step, and a second dampening mechanism 6 with a characteristic of a torsion angle of a first step. The dampening mechanism 4 also has a third dampening mechanism, discussed below, with a friction mechanism that operates throughout the range of the steps of torsion. The first dampening mechanism 5 and the second dampening mechanism 6 are disposed between the input rotary portion 2 and hub 3 so as to operate in series via a hub flange or intermediate plate 18. The third dampening mechanism is also disposed between the input rotary portion 2 and output hub 3.

Still referring to FIG. 6, the first dampening mechanism 5 basically includes a first elastic mechanism 7, a first friction mechanism 8 and a first stopper 11. The first elastic mechanism 7 has two sets of springs 16 and 17 as seen in FIG. 1. The first friction mechanism 8 generates friction when the hub flange 18 rotates relatively against the input rotary portion 2. The first stopper 11 is a mechanism that controls a relative turning angle between the hub flange 18 and the input rotary portion 2. The first stopper 11 allows the input rotary portion 2 and the hub flange 18 to rotate relatively to each other within a range of a torsion angle of $\theta_2+\theta_3$. The first elastic mechanism 7 (springs 16 and 17), the first friction mechanism 8 and the first stopper 11 are disposed between the hub flange 18 and the input rotary portion 2 so as to operate in parallel.

The second dampening mechanism 6 includes mainly a second elastic mechanism 9, a second friction mechanism 10 and a second stopper 12. The second elastic mechanism 9 is formed of a plurality of second springs 21. Each second spring 21 of the second elastic mechanism 9 has a spring constant, which is set to be smaller than each of the first springs 16 of the first elastic mechanism 7. The second friction mechanism 10 is set so as to generate a friction smaller than the friction generated by the first friction mechanism 8. The second stopper 12 is a mechanism to control a relative rotation between the hub 3 and the hub flange 18 and permits the hub 3 and the hub flange 18 to rotate relatively within a range of a torsion angle $\theta_1$. The second elastic mechanism 9, the second friction mechanism 10 and the second stopper 12 are disposed between the hub 3 and the hub flange 18 so as to operate in parallel.

The structure of the clutch disk assembly 1 will now be described in more detail with reference to FIG. 3. The input rotary portion 2 includes a clutch plate 31, a retaining plate 32 and a clutch disk 33. The clutch plate 31 and the retaining plate 32 are disk-shaped members which form annular plate portions that are disposed in an axial direction apart from each other by a predetermined distance. The clutch plate 31 is disposed on the first axis side, and the retaining plate 32 is disposed on the second axis side. The outer circumferential parts of the clutch plate 31 and the retaining plate 32 are fixedly coupled to each other by a plurality of stop pins 40 disposed in a circular direction side by side as seen in FIGS. 1 and 5. Consequently, the distance in an axial direction between the clutch plate 31 and the retaining plate 32 is determined by pins 40. Both plates 31 and 32 rotate together in a body. A cushioning plate 41 of the clutch disk 33 is fixedly coupled to the outer circumferential part of the clutch plate 31 by a plurality of rivets 43 as seen in FIGS. 1, 3 and 4. An annular friction facing 42 is fixedly coupled to both sides of the cushioning plate 41.

As seen in FIG. 3, several first receptacles 34 are formed in each of the clutch plate 31 and the retaining plate 32 in equal intervals in a circular direction. The first receptacle 34 is a portion, which swells slightly in an axial direction. Each of the first receptacles 34 has a first supporting portion 35 on its both sides in a circular direction. The first supporting portions 35 oppose each other in a circular direction. As seen in FIG. 4, several second receptacles 36 are formed in each of the clutch plate 31 and the retaining plate 32 in equal intervals in a circular direction. The second receptacles 36 are disposed adjacent to the R1 side of each of the first receptacles 34. Each of the second receptacles 36 has a second supporting portion 37 on its both sides in a circular direction. Each second receptacle 36 is longer than the first receptacle 34 in both a radial and circular directions as seen in FIG. 1.

As seen in FIGS. 4 and 5, at an outer circumferential edge of the retaining plate 32, a plurality of bent parts 51 that are bent toward the second axis side are formed. The bent parts 51 are formed adjacent to the stop pins 40. The bent parts 51 increase the strength of the circumference of the stop pin 40 over the stop pin 40 by itself. Therefore, the stop pins 40 can be disposed at the most radially outer sides of the clutch plate 31 and the retaining plate 32, resulting in a high stopping torque. Since the bent parts 51 do not lengthen the retaining plate 32 in a radial direction, the length of the retaining plate 32 can be smaller in a radial direction compared with that of the conventional one with the same strength. When the length of the retaining plate 32 in a radial direction is the same with that of the conventional one, the stop pins 40 can be disposed at the more radially outer side compared with the conventional one. Since the bent parts 51 are formed partially around the retaining plate 32, the amount of metal plate material is reduced.

As seen in FIG. 3–5, the hub flange 18 is disposed in an axial direction between the clutch plate 31 and the retaining plate 32. The hub flange 18 operates as an intermediate portion between the input rotary portion 2 and the hub 3. The hub flange 18 is a disk-shaped member or annular portion that is thicker than the plates 31 and 32. At the hub flange 18, several first window holes 57 are formed corresponding to the first receptacles 34. The first window holes 57 are formed for the first receptacles 34. The circular angle of each of the first window holes 57 is smaller than the circular angles between the first supporting portions 35 of the first receptacles 34. The centers of a rotary direction of the first window holes 57 coincide approximately with that of the first receptacles 34. Therefore, as seen in FIG. 1, a gap of a torsion angle $\theta_2$ is formed at both sides in a circular direction between the circular ends of the first window holes 57 and the first supporting portions 35 of the first receptacles 34.

The springs 17 are installed within the first window holes 57. The springs 17 are coil springs with their circular ends touching the circular ends of the first window holes 57. In this condition, gaps with torsion angles $\theta_2$ exist between both circular ends of the springs 17 and the first supporting parts 35 of the first receptacles 34 as seen in FIG. 1.

As seen in FIG. 4, at the hub flange 18, the second window holes 56 are formed at the locations corresponding to the second receptacles 36. The lengths of the second window holes 56 in radial and circular directions coincide approximately with those of the second receptacles 36. The first springs 16 are disposed within the second window holes 56. The first springs 16 form an elastic portion that includes two kinds of coil springs. The circular ends of first springs 16 touch both circular ends of the second window holes 56. In addition, both the circular ends of the first springs 16 touch the second supporting portions 37 of the second receptacle 36.

As seen in FIGS. 3 and 4, a cylinder-shaped portion 59, which extends in axially both directions, is formed at the inner circumferential part of the hub flange 18. The cylinder-shaped portion 59 has a plurality of internal teeth 61 formed thereon as seen in FIG. 2. These internal teeth 61 extend radially inward from the cylinder-shaped portion 59.

The hub 3 is a cylinder-shaped portion, which is disposed at the inner circumferential side of the plates 31 and 32 as well as at the inner circumferential side of the hub flange 18. In other words, the hub 3 is located within a center hole of each of these portions. The hub 3 includes mainly a cylinder-shaped boss 62. The hub 3 has a plurality of splines 63 formed at a center hole of the boss 62. Since the splines 63 are connected with the splines of a shaft extending from the transmission, it is possible to output a torque from the hub 3 to the transmission shaft. A flange 64 extends radially outwardly from the boss 62 of hub 3. In this embodiment, the width of the flange 64 as measured in a radial direction is small. The flange 64 of hub 3 has a plurality of external teeth 65 extending radially outward therefrom. The external teeth 65 can be thought to form a part of the flange 64 that extends radially outwardly from the boss 62. The external teeth 65 have a radial length corresponding to the cylinder-shaped portion 59 of the hub flange 18. The external teeth 65 extend within a space between the internal teeth 61, and gaps with predetermined torsion angles $\theta_1$ are formed in a circular direction at both sides of the external teeth 65. The torsion angle $\theta_1$ on the R2 side of the external teeth 65 is set to be slightly larger than the torsion angle $\theta_1$ on the R1 side. The circular width of either the internal tooth 61 or the external tooth 65 is getting smaller, as it is located closer to the end of the tooth in a radial direction.

Since both the internal teeth 61 and the external teeth 65 are formed along the entire periphery, the areas which both the internal teeth 61 and the external teeth 65 touch each other increase. In other words, being different from the conventional teeth, a cutout in which an elastic portion with a low rigidity is disposed is not formed. As the result, the contact areas between the internal teeth 61 and the external teeth 65 increase. In other words, since a bearing stress between both of these portions decreases, an abrasion or damage of the portions is unlikely to occur. Consequently, the present teeth system has a characteristic of a high torque using a smaller space compared with that in which a part of the teeth are deleted.

The second dampening mechanism 6 will now be described as follows with particular reference being made to FIGS. 3–5 and 8–11. The second dampening mechanism 6 not only transmits a torque between the hub 3 and the hub flange 18, but also absorbs and dampens torsion vibrations. The second elastic mechanism 9 of the second dampening mechanism 6 mainly includes the second springs 21. The second friction mechanism 10 of the second dampening mechanism 6 includes a bushing 19, a fixing plate 20 and a second corn spring 78. The second dampening mechanism 6 is located to be different in an axial direction from the internal teeth 61 and the external teeth 65, which connect the hub 3 and the hub flange 18. In particular, as seen in FIGS. 3–5, the second dampening mechanism 6 is placed so as to be shifted from the internal teeth 61 and the external teeth 65 to the transmission side. In this way, the sufficient contact areas between the internal teeth 61 and the external teeth 65 can be secured. In addition, since the second dampening mechanism 6 is not disposed between the internal teeth 61 and the external teeth 65, the sufficient margin to connect the second springs 21 can be secured, being different from the conventional one. As the result, since a spring sheet is not necessary, the performance to assemble the second springs 21 is improved.

The fixing plate 20 operates as an input portion of the input side in the second dampening mechanism 6. In other words, the fixing plate 20 is a portion to which a torque is inputted from the hub flange 18. The fixing plate 20 is a thin metal plate portion disposed between the inner circumference of the hub flange 18 and the inner circumference of the retaining plate 32. As shown in FIG. 8 to 11, the fixing plate 20 includes a first disk-shaped portion 71, a cylinder-shaped or tubular portion 72 and the second disk-shaped portion 73. The cylinder-shaped portion 72 extends from the inner circumferential edge of the first disk-shaped portion 71 toward the second axis side (the transmission side). The second disk-shaped portion 73 extends from the cylinder-shaped portion 72 inward in a radial direction.

As seen in FIGS. 2–5, a spacer 80 is disposed between the first disk-shaped portion 71 of the fixing plate 20 and the hub flange 18. The spacer 80 connects the fixing plate 20 with the hub flange 18 in a rotary direction, and plays a role to receive a force which is applied from the fixing plate 20 to the hub flange 18. The spacer 80 is an annular resin portion, and has many lightening portions to decrease the weight. The spacer 80 includes an annular portion 81and a plurality of protrusions 82 projecting from the annular portion 81 outward in a radial direction as seen in FIG. 2. Two cutouts 83 are formed at the outer circumferential edge of each of the protrusions 82. A projection 84 extends from each of the protrusions 82 toward the first axis side as seen in FIG. 3. Projections 84 are inserted in connecting holes 58, which are formed in the hub flange 18. The projections 84 are connected with the connecting holes 58 such that they are slightly movably in a radial direction and relatively unmovably in a rotary direction.

Figure 8:
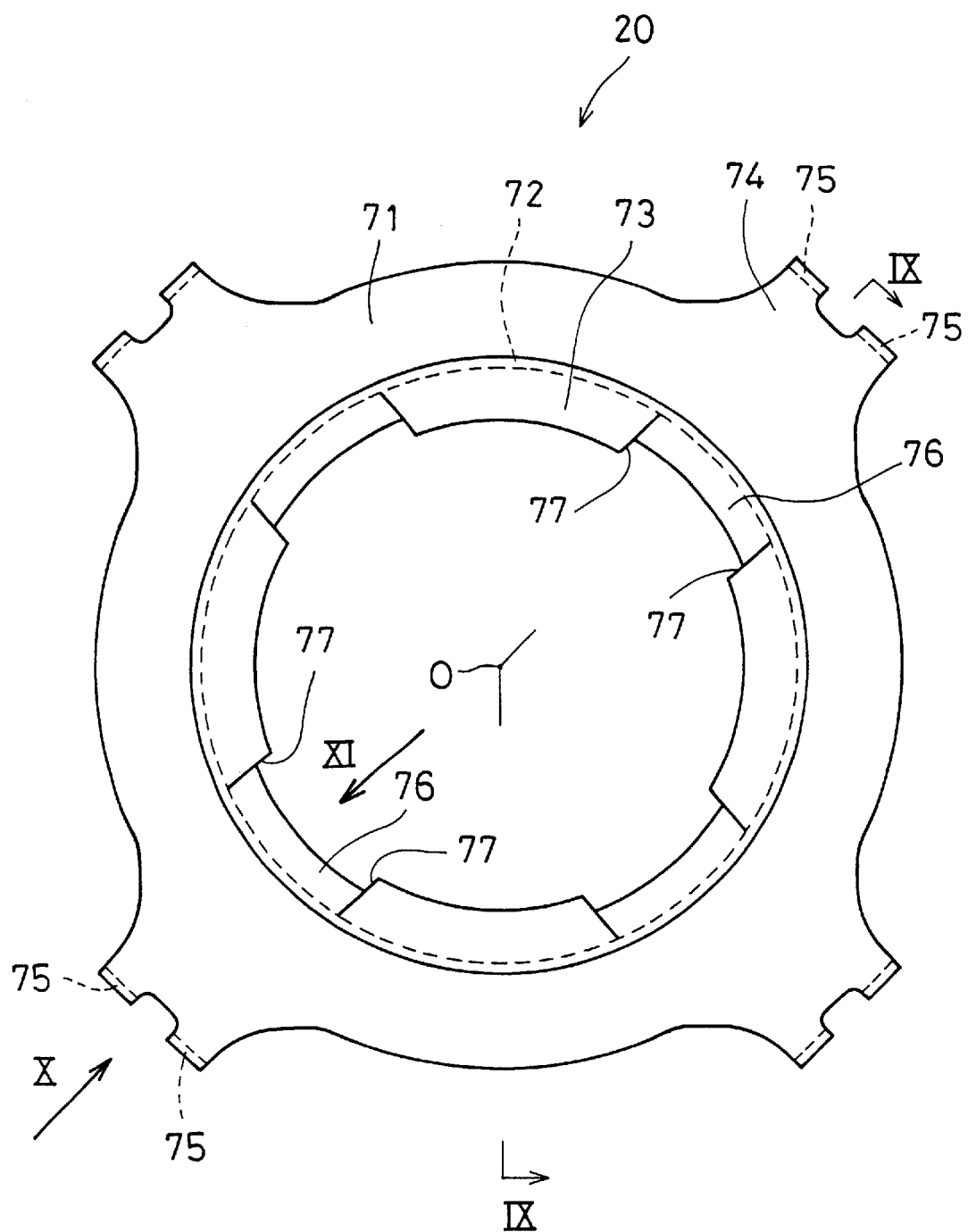
FIG. 8 is a side elevational view of a fixing plate utilized with the clutch disk assembly illustrated in FIG. 1 in accordance with the present invention.
Figure 9:
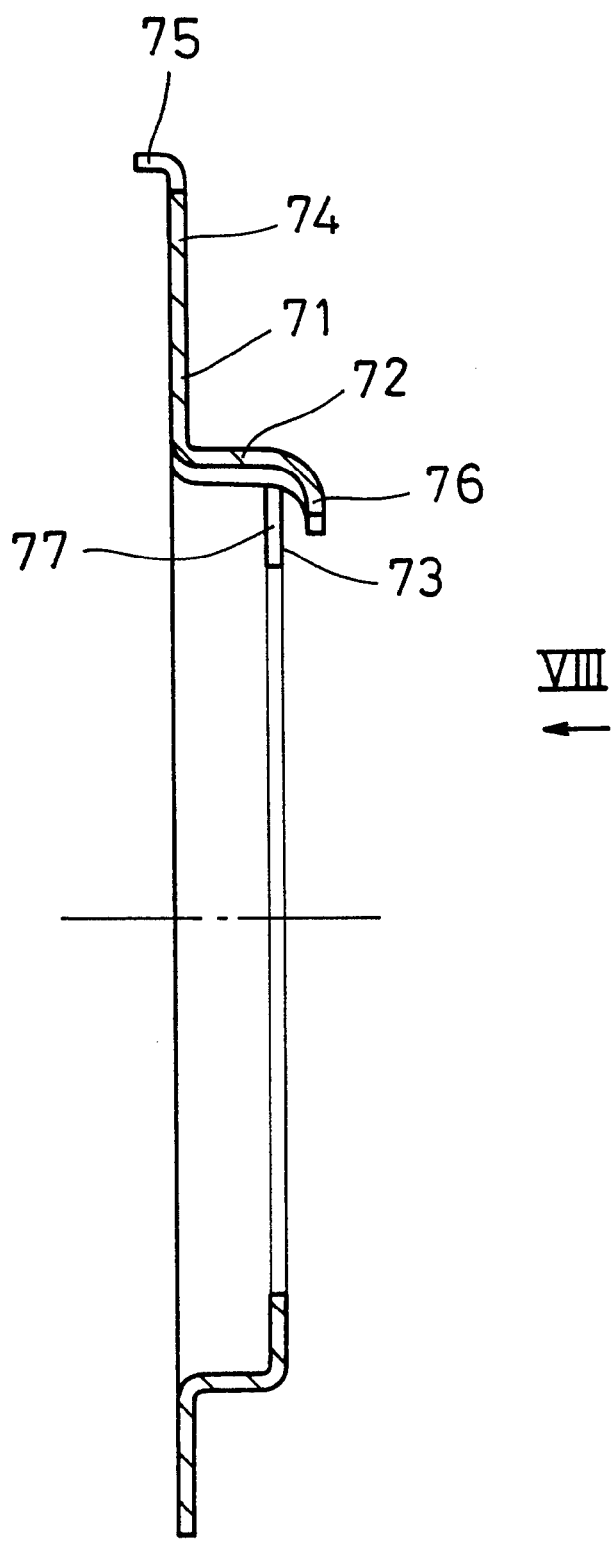
FIG. 9 is a cross sectional view the fixing plate illustrated in FIG. 8 as viewed along section line IX—IX of FIG. 8.
Figure 10:
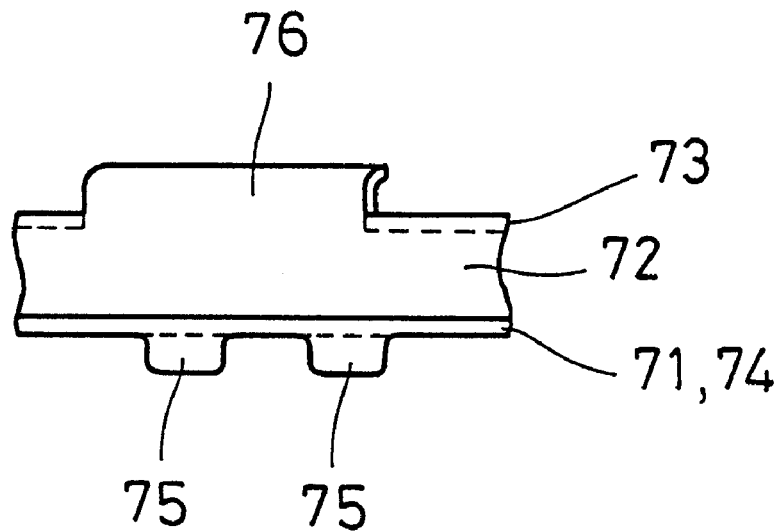
FIG. 10 is a partial edge elevational view of a part of the fixing plate illustrated in FIG. 8 as viewed along an arrow X of FIG. 8.
Figure 11:
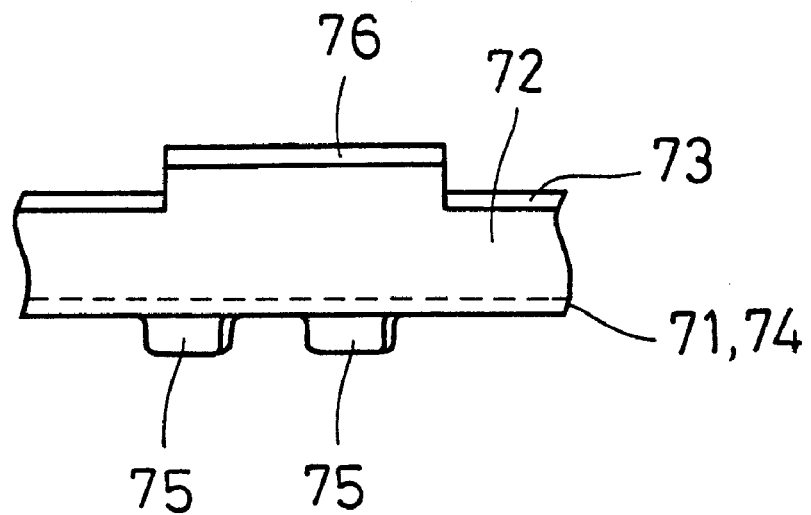
FIG. 11 is a partial edge elevational view of a part of the fixing plate illustrated in FIG. 8 as viewed along an arrow XI of FIG. 8.
Figure 12:
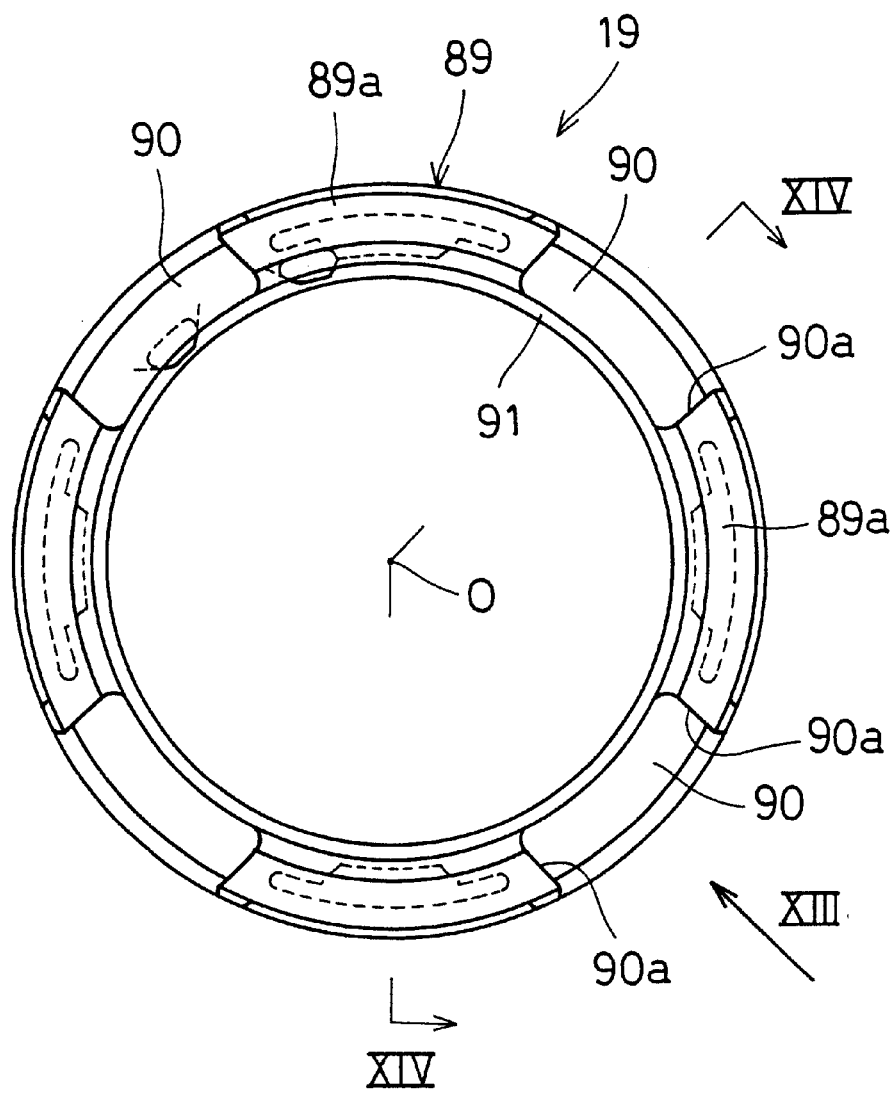
FIG. 12 is a front side elevational view of a bushing utilized with the clutch disk assembly illustrated in FIG. 1 in accordance with the present invention.
Figure 13:
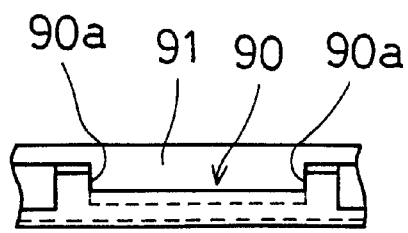
FIG. 13 is a partial edge elevational view of a part of the bushing illustrated in FIG. 12 as viewed along an arrow XIII of FIG. 12.

As seen in FIGS. 2 and 8, fixing plate 20 has four protrusions 74. Protrusions 74 project outwardly in a radial direction at equal intervals in a circular direction from the first disk-shaped portion 71 of the fixing plate 20. Each of the protrusions 74 are formed corresponding to the protrusions 82 of the spacer 80. Nails or tabs 75 of protrusions 74 are located within the cutouts 83 which are formed at the ends of the protrusions 82 of the spacer 80. In the structure mentioned above, the fixing plate 20 is fixedly connected with the hub flange 18 via the spacer 80 to be relatively unrotatably relative to each other. In other words, the fixing plate 20 is connected to hub flange 18 so that a torque can be transmitted from the hub flange 18 to fixing plate 20. In addition, the hub flange 18 via the spacer 80 supports the first axis side of the fixing plate 20. The fixing plate 20 is movable toward the second axis side away from the spacer 80 and the hub flange 18.

Referring to FIGS. 1–5, the first friction mechanism 8 that is formed between the fixing plate 20 and the retaining plate 32 will now be described in more detail. The first friction mechanism 8 includes a first friction washer 48 and a first corn spring 49. The first friction washer 48 is connected with the retaining plate 32 so as to be relatively non-rotatable, but axially movably relative to each other, and generates a friction by rubbing the fixing plate 20. The first friction washer 48 includes mainly an annular resin portion. The first friction washer 48 includes an annular portion 85 made of a resin and a friction portion 86.

The resin used to form the annular portion 85 generally includes a rubber type resin and a nylon type resin. For example, the resin, which is used for the annular portion 85, can be PPS (polyphenylensulfide) or PA 46 either of which is a polyamide type nylon resin. When the annular portion 85 is not molded, PPS is preferred, and when the annular portion 85 is molded, PA 46 is preferred. The description mentioned above can be applied to other annular resin portion mentioned herein.

A friction portion 86 is molded to or bonded to the fixing plate 20 side of the annular portion 85. The friction portion 86 is a portion that is designed to increase a friction coefficient between the first friction washer 48 and the fixing plate 20, and extends in an annular or disk-like shape. The annular portion 85 has a plurality of rotationally connecting portions 87 extending toward the second axis side. These connecting portions 87 are formed at the inner circumference of the annular portion 85. The rotationally connecting portions 87 are inserted in a plurality of cutouts 53 which are formed in a center hole 52 (inner circumferential edge) of the retaining plate 32. In this way, the first friction washer 48 is connected with the retaining plate 32 relatively non-rotatable, but in an axially movable manner. In addition, in the annular portion 85, connecting portions 88, which extend outward in a radial direction from the outer circumferential edge and then extend toward the second axis side. The connecting portions 88 are relatively thin and have a tab or detent portion at the end. The connecting portions 88 are inserted in holes 54, which are formed at the retaining plate 32, and its tab or detent portions of connecting portions 88 are connected with the retaining plate 32. The connecting portions 88 urge itself outward in a radial direction when it is connected, and press itself against the holes 54. Therefore, after partially assembling (sub-assembling), the first friction washer 48 is difficult to remove from the retaining plate 32. In this way, at the first friction washer 48, the rotationally connecting portions 87 transmit a torque and the connecting portions 88 connect temporarily a portion of first friction washer 85 with the retaining plate 32. The connecting portions 88 are thin and able to bend. Since the connecting portions 88 have a low rigidity, it will not typically break during sub-assembling. Therefore, since a force is not applied to the rotationally connecting portions 87 during sub-assembling, the first friction washer 48 is less likely to be broken than the conventional resin friction washer which have a tab or detent portion of radially connecting portions 88 to connect a retaining plate 32. In addition, since a press fitting machine is not necessary during sub-assembling, an equipment cost can be reduced.

The first corn spring 49 is disposed between the first friction washer 48 and the inner circumference of the retaining plate 32. The first corn spring 49 is compressed in an axial direction between the retaining plate 32 and the first friction washer 48. The outer circumferential edge of the first corn spring 49 is supported by the retaining plate 32, while the inner circumferential edge of the first corn spring 49 contacts the annular portion 85 of the first friction washer 48. As seen in FIG. 2, the first corn spring 49 has a plurality of cutouts 49a formed on its inner circumferential side. It can be thought that the cutouts 49a at the inner circumferential edge form a plurality of projections on the inner circumferential edge of first corn spring 49. Projection parts that are formed on the outer circumferential side of the rotationally connecting portions 87 of the first friction washer 48 are inserted in the cutouts 49a. In this way, the first corn spring 49 is connected with the first friction washer 48 relatively non-rotatable manner.

Referring to FIGS. 8–11, at the second disk-shaped portion 73 of the fixing plate 20, several cut and lift parts 76 are formed at equal intervals in a circular direction. The cut and lift parts 76 are formed by cutting and lifting from the inner circumferential side of the second disk-shaped portion 73. The cut and lift parts 76 are disposed closer to the second axis side compared with other parts of the second disk-shaped portion 73. At a part of the second disk-shaped portion 73 where the cut and lift parts 76 are formed, a cutout part is formed as seen in FIG. 8. A supporting part 77 is formed at both ends of the cutout part in a circular direction.

Figure 14:
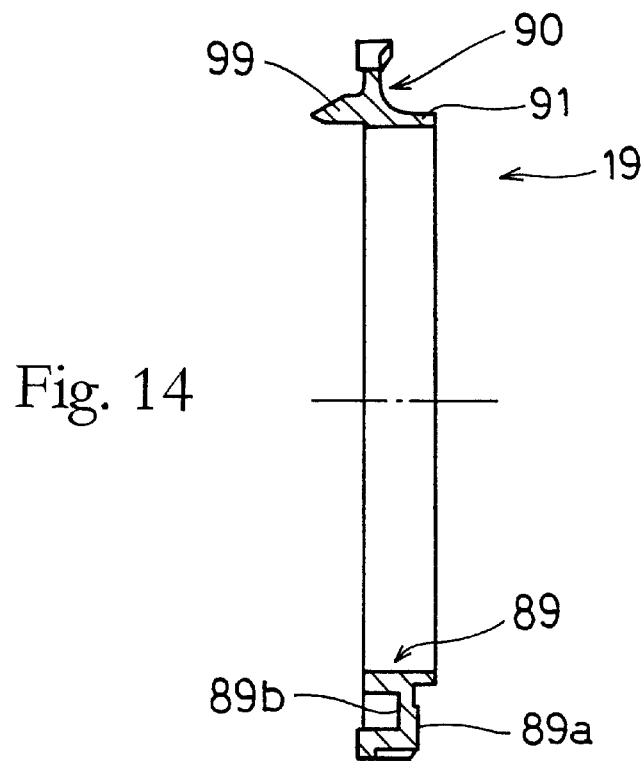
FIG. 14 is a cross sectional view of the bushing illustrated in FIG. 12 as viewed along action line XIV—XIV in FIG. 12.
Figure 15:
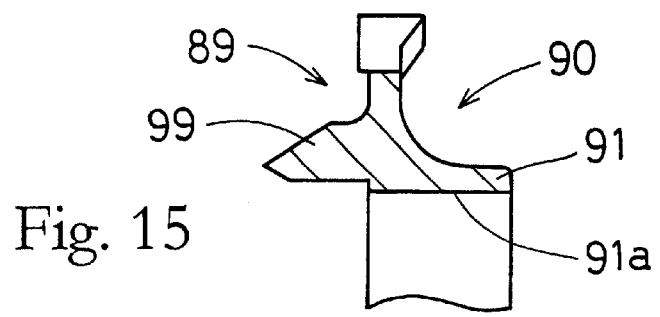
FIG. 15 is an enlarged, partial cross sectional view of a part the bushing illustrated in FIGS. 12–14.

A bushing 19 operates as an output portion in the second dampening mechanism 6. The bushing 19 is connected with the hub 3 in a relatively nonrotatable manner. In particular, the bushing 19 is an annular resin portion, which is disposed on the second axis side of both the internal teeth 61 of the hub flange 18 and the external teeth 65 of the hub 3. The bushing 19 is also located on the inner circumferential side of the cylinder-shaped portion 72 of the fixing plate 20, and in a space on the outer circumferential side of the second axis side part of the boss 62. The bushing 19 includes mainly an annular portion 89 with a plurality of spring receptacles 90, as shown in FIGS. 12 to 19. The spring receptacles 90 are formed at equal intervals in a circular direction at the side face of the second axis side of the annular portion 89. The spring receptacles 90 are formed at locations corresponding to the cut and lift parts 76 or the cutout parts of the fixing plate 20. The spring receptacles 90 are concave parts that are formed at the side face of the bushing 19 on the second axis side. The concave parts, as shown in FIG. 14 and 15, are formed smoothly so that its cross section forms a part of a circle. In addition, a hole is formed that penetrates in an axial direction each spring receptacle 90 at its center in both radial and circular directions. At the inner circumference of the annular portion 89, an inner circumferential supporting part 91 is formed with a cylinder like shape. The supporting part 91 extends toward the second axis side from the annular portion 89. An inner circumferential face 91a of the bushing 19 is formed by the inner circumferential supporting part 91. This inner face 91a touches or is close to the outer circumferential face of the boss 62. A side face 89a is formed on the second axis side of the annular portion 89 of the bushing 19. This side face 89a touches the side face of the first axis side of the second disk-shaped portion 73 of the fixing plate 20.

The second friction mechanism 10 is formed between the annular portion 89 of the bushing 19 and the second disk-shaped portion 73 of the fixing plate 20. The second springs 21 are disposed within each of the spring receptacles 90. The second springs 21 are preferably coil springs that are smaller than the first spring 16 or the spring 17. The second spring 21 also has spring constants that are smaller than the first spring 16 or the spring 17. The second springs 21 are disposed within the spring receptacles 90 with the ends of the second springs 21 in a circular direction touching or close to both ends of the spring receptacles 90 in a circular direction. Both the axially inside part (the first axis side) and the inner circumferential side of the second springs 21 are supported by the bushing 19 within the spring receptacles 90.

The supporting parts 77 of the fixing plate 20 are connected in a rotary direction with both the circular ends of the second springs 21. In this way, a torque is transmitted from the fixing plate 20 to the bushing 19 via the second springs 21. The first axis side of the end face of the second springs 21 in a circular direction is totally supported by the circular end of the spring receptacles 90. In addition, the circular end faces of the second springs 21 are supported by supporting parts 77. Thus, the second spring 21 has a large connecting margin at both circular ends. In other words, at both circular ends of the second springs 21 the area of a part, which is supported increases. This arrangement is made possible by disposing the second springs 21 at a location, which is shifted in an axial direction from the conventional location between a hub 3 and a hub flange 18. Consequently, a spring sheet can be removed, resulting in the reduced number of parts.

The cut and lift parts 76 are disposed so as to support the axial outsides (the second axis sides) of the second springs 21. Thus, the outer circumferential side and the axial outsides of the second springs 21 are supported by the fixing plate 20.

Figure 16:
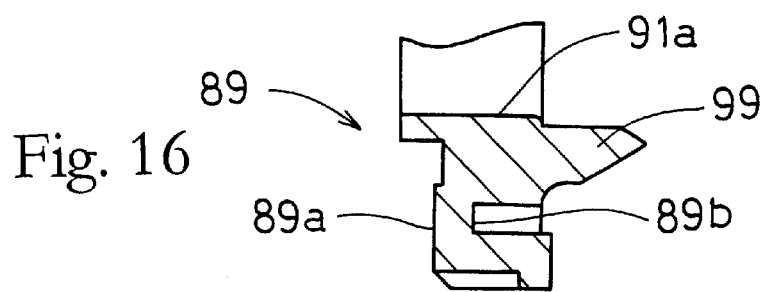
FIG. 16 is an enlarged, partial cross sectional view of a part the bushing illustrated in FIGS. 12–15 as viewed along section line XVI—XVI of FIG. 17.
Figure 17:
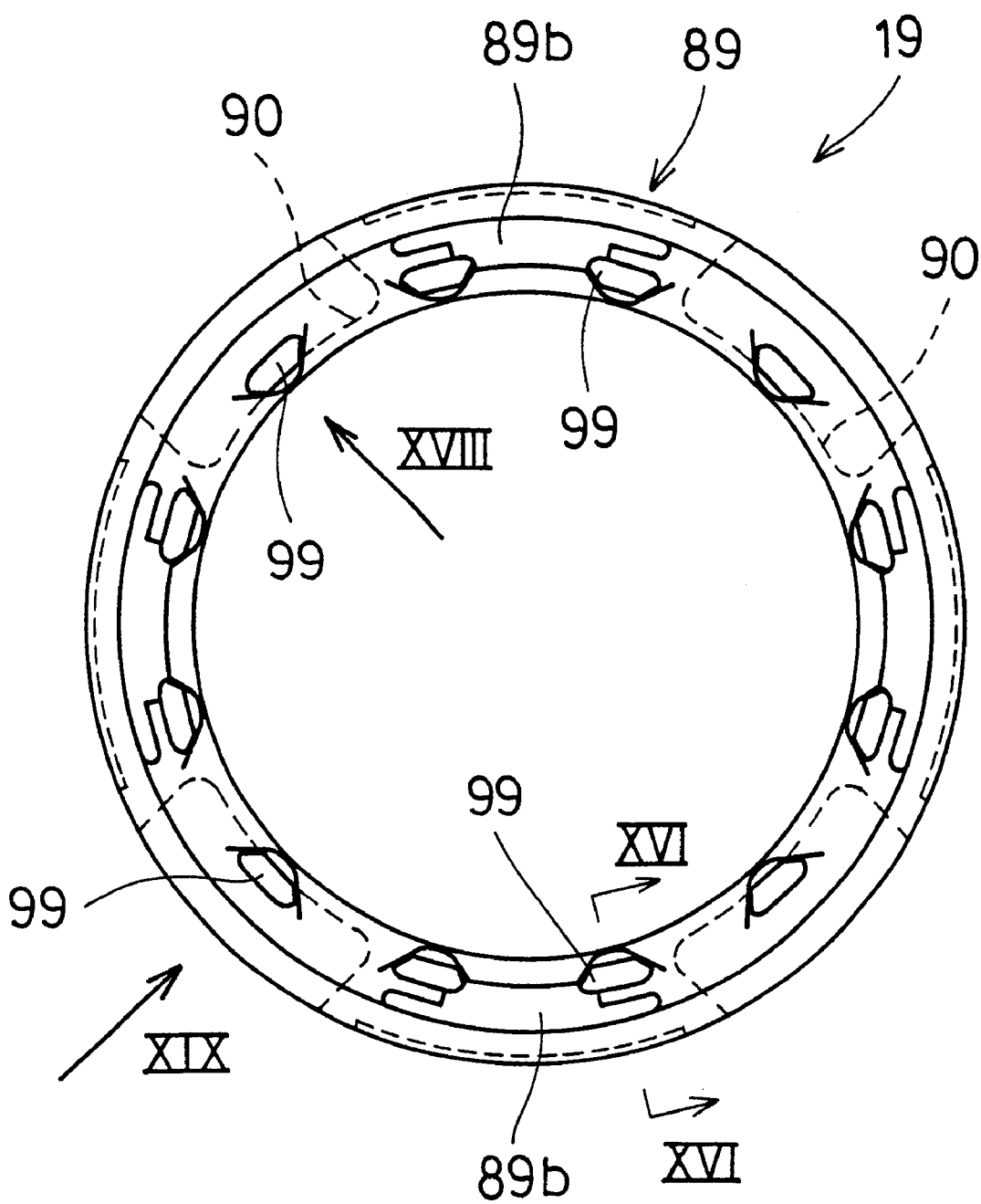
FIG. 17 is a back side elevational view of the bushing illustrated in FIGS. 12–16 for use with the clutch disk assembly illustrated in FIG. 1 in accordance with the present invention.
Figure 18:
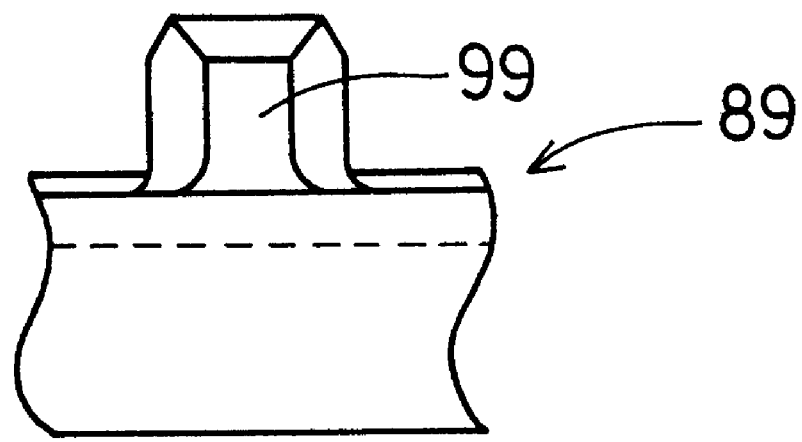
FIG. 18 is an enlarged, partial cross sectional view of a part the bushing illustrated in FIGS. 12–17 as viewed along an arrow XVIII of FIG. 17.
Figure 19:
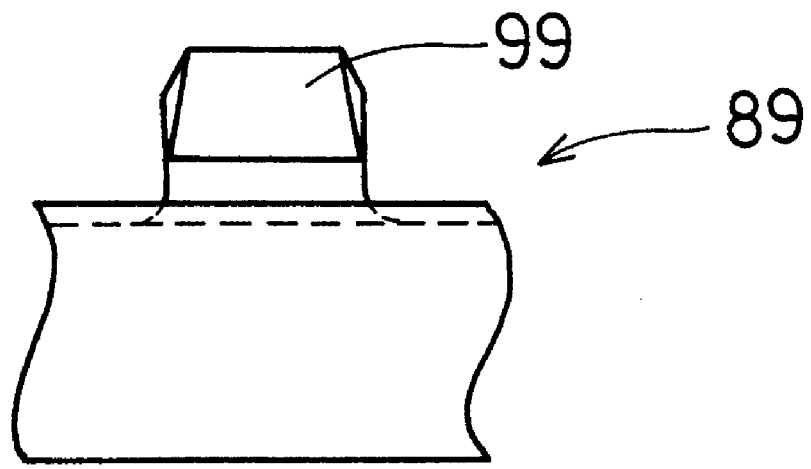
FIG. 19 is an enlarged, partial cross sectional view of a part the bushing illustrated in FIGS. 12–18 as viewed along an arrow XIX in FIG. 17.

As seen in FIGS. 4, 16 and 17, several connecting parts 99 are formed at the bushing 19 that extend from the annular portion 89 toward the first axis side. The connecting parts 99 are projections that extend toward the first axis side for transmitting a torque from the bushing 19 to the hub 3. The connecting parts 99 have cross sections that fit into gaps between the external teeth 65. The connecting parts 99 are inserted between the external teeth 65 of the hub 3. Thus, the connecting parts 99 are connected with the external teeth 65 in an unmovable manner in a circular direction.

A second corn spring 78 is an urging portion in the second friction mechanism 10 to urge the second disk-shaped portion 73 and the annular portion 89 towards each other in an axial direction. The second corn spring 78 is disposed in an axial direction between the bushing 19 and the external teeth 65 of the hub 3 and the internal teeth 61 of the flange 18. The inner circumference of the second corn spring 78 is supported by the flange 64 of the hub 3, while the outer circumference of the second corn spring 78 touches the annular portion 89 of the bushing 19. The second corn spring 78 is compressed in an axial direction, and urges the bushing 19 toward the second axis side. As the result, the side face 89a of the second axis side of the annular portion 89 of the bushing 19 and the side face of the first axis side of the second disk-shaped portion 73 of the fixing plate 20 are urged towards each other in an axial direction by a predetermined force. The second corn spring 78 has an inner and outer diameters smaller than those of the first corn spring 49. The second corn spring 78 also has a thickness that is much smaller than that of the first corn spring 49. Thus, an urging force of the second corn spring 78 is much smaller than that of the first corn spring 49. At an inner circumferential edge the second corn spring 78 has a plurality of cutouts formed at an inner circumferential edge of the second corn spring 78. It can be thought that the cutouts of the corn spring 78 form a plurality of projections at the inner circumferential edge. The connecting parts 99 mentioned above extend within the cutouts of the corn spring 78.

As described above, the fixing plate 20 operates in the second dampening mechanism 6 as an input portion to connect with the second springs 21, as a portion included in the second friction mechanism 10, and as a portion included in the first friction mechanism 8. An advantage for the use of the fixing plate 20 is described as follows. The fixing plate 20, as described above, operates in the second dampening mechanism 6 as an supporting portion to support both ends of the second springs 21 in a circular direction and as an portion included in the second friction mechanism 10. Thus, one portion has two functions, resulting in a small number of parts. In addition, the fixing plate 20 supports the outside in an axial direction of the second spring 21. Furthermore, the fixing plate 20 includes friction faces both for the second friction mechanism 10 to generate a friction by rubbing at the first step of the torsion characteristic and for the first friction mechanism 8 to generate a friction by rubbing at the second step of the torsion characteristic. Thus, one portion has two friction faces, resulting in an easy adjustment and control of the friction characteristic of both friction faces. In other words, rubbing faces for both a flange of a boss and a hub flange are not necessary to be controlled, being different from that of the conventional dampening mechanism. Particularly, since the fixing plate 20 has a small size and a simple structure, being different from the conventional hub or hub flange, it is easy to control its friction face. Since the fixing plate 20 mentioned above is made of a metal plate, the fixing plate 20 with a desired shape can be obtained easily by press working, resulting in a low cost of the fixing plate 20.

An advantage of the bushing 19 is described as follows. Since the bushing 19 is made of a resin, its desired shape can be obtained easily. Particularly, since it is made of a resin and the connecting parts 99 can be formed in a body, its production is easy. The connecting parts 99 are connected with the external teeth 65 of the hub 3 therebetween in a circular direction. Therefore, it is not necessary to form a particular hole or concave to connect with the hub 3. Consequently, the working process for the hub 3 does not increase. The bushing 19 operates as an output portion of the second dampening mechanism 6. The bushing 19 connects with both circular ends of the second springs 21, and includes a part of the second friction mechanism 10. Thus, a single portion performs a torque transmission and friction generation, resulting in the small number of total parts.

The second corn spring 78 which urges friction faces each other in an axial direction in the second friction mechanism 10 is supported by the flange 64 of the hub 3. Thus, the second corn spring 78 is not supported by a retaining plate, being different from the conventional one, but supported by a different portion. Therefore, a hysteresis torque at the first step of characteristic is stable. Therefore, it is easy to control the hysteresis torque of the first step. A retaining plate 32 supports both the conventional first and second urging portions. Therefore, an urging force of the first elastic portion may deform a retaining plate, resulting in a change of a posture of the second urging portion and a problem of an unstable urging force of the second urging portion. In this embodiment, an urging force of the first corn spring 49 and that of the second corn spring 78 are applied to the fixing plate 20 each other in an axially opposite direction. In other words, the first corn spring 49 urges the fixing plate 20 via the first friction washer 48 toward the first axis side, on the contrary the second corn spring 78 urges the fixing plate 20 via the bushing 19 toward the second axis side.

The structure of the second stopper 12 is not to apply a torque to each portion of the second dampening mechanism 6, when a torque is large. A torque is not applied to the bushing 19, the second coil springs 21 and the fixing plate 20 within a range of the second step of the torsion characteristic. Consequently, each portion does not need a very large strength and its design is easy.

Figure 20:
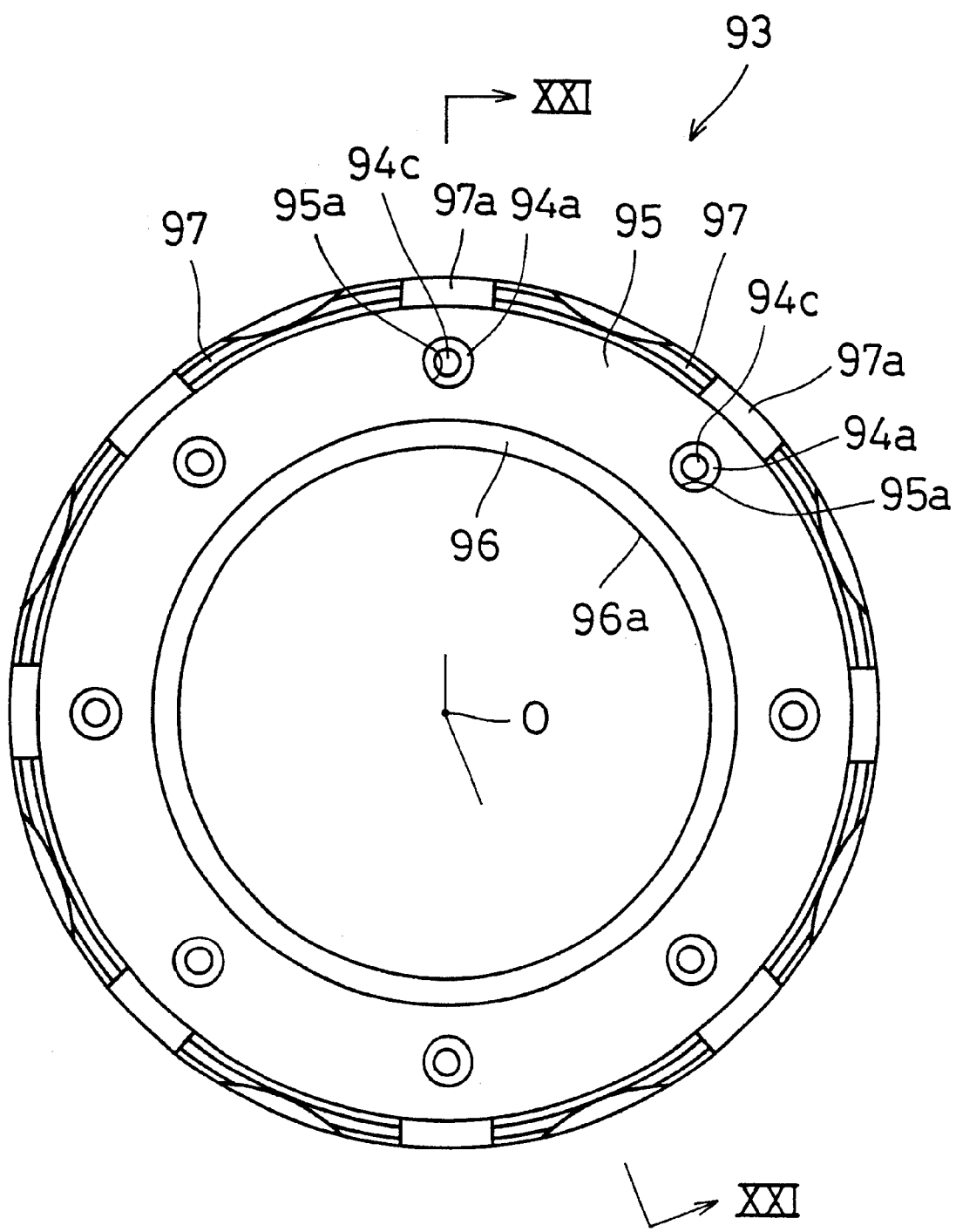
FIG. 20 is a front side elevational view of a friction bushing for use with the clutch disk assembly illustrated in FIG. 1 in accordance with the present invention.
Figure 21:
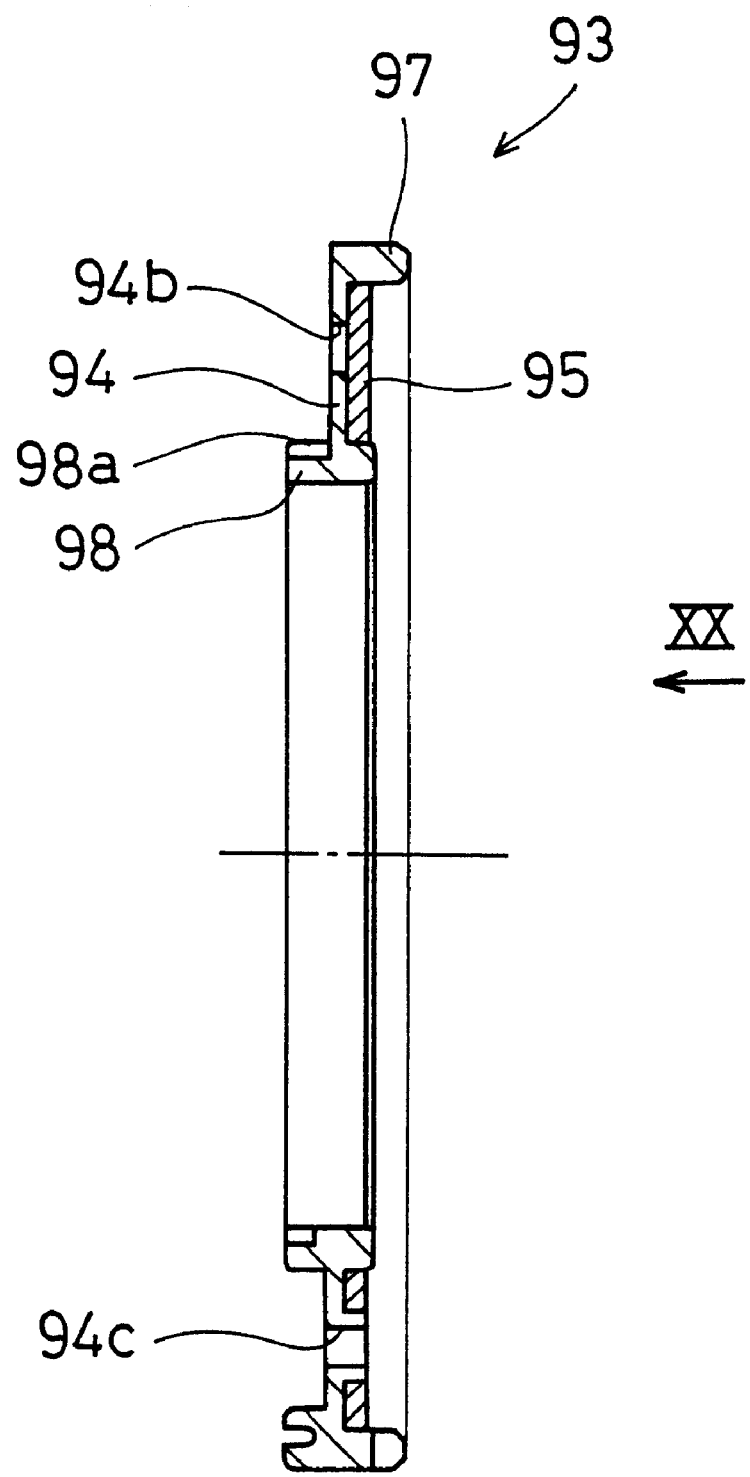
FIG. 21 is a cross sectional view of the friction bushing illustrated in FIG. 20 as viewed along section line XXI—XXI of FIG. 20.
Figure 22:
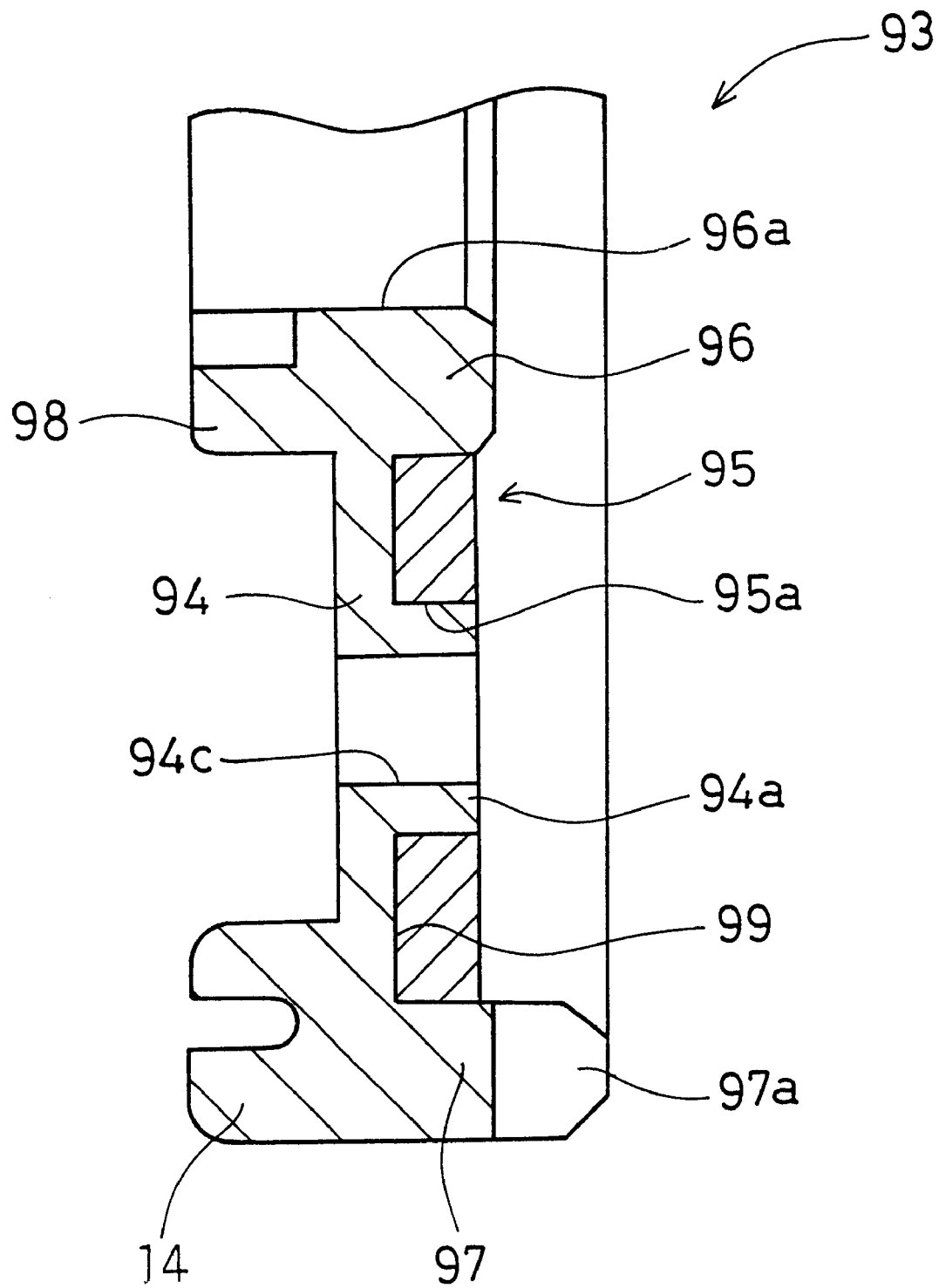
FIG. 22 is an enlarged, partial cross sectional view of a part the friction bushing illustrated in FIG. 21.

Referring to FIGS. 3–5 and 20–22, a bushing 93, which forms a part of a third dampening mechanism, will now be described in more detail. The bushing 93 is disposed at the inner circumference of the clutch plate 31 and touches the outer circumferential face of the hub 3, the end face of the flange 64, the external teeth 65, the cylinder-shaped portion 59 of the hub flange 18 and the internal teeth 61. Functions of the bushing 93 includes dampening vibrations in a rotary direction by generating a friction, locating the clutch plate 31 for the hub 3 in a radial direction, and locating the hub flange 18 for the hub 3 in a radial direction. The bushing 93, as shown in FIGS. 20 to 22, includes mainly an annular resin portion 94. The annular portion 94 is a disk-shaped portion that has a predetermined width in a radial direction and a small thickness in an axial direction. The annular portion 94 is disposed between the inner circumference of the clutch plate 31 and that of the hub flange 18 in an axial direction. An annular friction portion 95 is molded to, bonded to, or simply disposed at the annular portion 94 on the second axis side. The friction portion 95 has an annular shape, with a disk-shaped portion, which has a predetermined width in a radial direction and a small thickness in an axial direction. The friction portion 95 is made of a material with a high friction coefficient, for example, a rubber type material, a glass type mixed fiber spinning or impregnated compact or a ceramic. The friction portion 95 gives a characteristic of a high friction coefficient to the bushing 93. The magnitude of its friction can be adjusted by selecting the material of friction portion 95.

As shown in a plan view of FIG. 20, the inner and outer diameters of the annular portion 94 and the friction portion 95 are circular. The friction portion 95 can be thought to be disposed so as to touch the side face of the annular portion 94 on the second axis side, or thought to be disposed within a channel, which is formed at the side face of the annular portion 94 on the second axis side. In other words, a cylinder-shaped part 96 extends toward the second axis side, and is formed at the inner circumferential edge of the annular portion 94, with a cylinder-shaped part 97 extending toward the second axis side at its outer circumferential edge. An annular space surrounded by the cylinder-shaped portions 96 and 97 forms a channel of the annular portion 94. An inner and outer diameters of the channel are circular, and the friction portion 95 is disposed within the channel.

The cylinder-shaped portion 96 touches the side face of the flange 64 of the hub 3 on the first axis side as seen in FIG. 4. This portion rubs within a range of the first step of the torsion. The friction portion 95 touches the cylinder-shaped portion 59 of the hub flange 18 and the end face of the internal teeth 61 on the first axis side. This portion rubs within a range of the second step of the torsion. A small gap is secured between the friction portion 95 and the side face of the external teeth 65 of the hub 3 on the first axis side. The cylinder-shaped portion 59 of the hub flange 18 and the end face of the internal teeth 61 on the first axis side touch only the friction portion 95 in an axial direction.

Several holes 95a are formed side by side in a circular direction at the friction portion 95, and projections 94a of the annular portion 94 are inserted in the holes 95a. In this way, a whirl stop between the annular portion 94 and the friction portion 95 is performed. Particularly, since the friction portion 95 has a circular shape, such a whirl stop plays an important role. In the conventional friction portion, when it has a circular shape, there is a possibility to cause a problem concerning its strength, such as a peeling by adhering to a backboard made of SPCC. Therefore, in the conventional friction portion, a whirl stop is performed by using a friction portion with a square shape. While the friction portion 95 in accordance with the present invention has a simple structure with a circular shape, it does not have a problem such as a peeling. Particularly, it is easy to form the holes 95a of the friction portion 95 and to form the projections 94a of the annular resin portion 94, resulting in a reduction of a cost.

In the present embodiment, since the friction portion 95 is not fixedly coupled to the annular portion 94, the friction portion 95 can come off in an axial direction. Therefore, a working such as a bonding is not necessary. However, in this embodiment in accordance with the present invention, the friction portion 95 may be bonded to the annual portion 94.

Several holes 94b are formed side by side in a circular direction in the annual portion 94. The holes 94b extend in an axial direction. The holes 94b connect the first axis side and second axis side of the annular portion 94, and expose a part of the side face of the friction portion 95 on the first axis side. As seen in FIG. 3, holes 13 are formed at the inner circumference of the clutch plate 31, corresponding to the holes 94b. The holes 13 have a diameter larger than that of the holes 94b, and expand to the circumference of the holes 94b. Thus, a part of the friction portion 95 is exposed to the outside of the clutch disk assembly 1 through the holes 94b and the holes 13, which are formed at the identical position. Therefore, the friction portion 95 is cooled sufficiently, in other words the friction portion 95 radiates a heat to an atmosphere on the clutch plate 31 side, resulting in a prevention of a change of a friction characteristic by a friction heat of the friction portion 95. The endurance strength of the friction portion 95 is improved, and a fall of a hardness of the hub 3 and the hub flange 18 is prevented. In addition, holes 94c are formed that extend in an axial direction and penetrate the projections 94a. The holes 94c connect the first and second axis sides of the annular portion 94. The holes 94b and 94c reduce a total volume of the bushing 93, resulting in a reduction of an amount of a resin used and a reduction of a cost.

A cylinder-shaped part 98 extending toward the first axis side is formed at the inner circumferential edge of the annular portion 94. The inner circumferential face of the cylinder-shaped portions 96 and 98 touches the outer circumferential face of the boss 62. In this way, a positioning (centering) of the clutch plate 31 and the retaining plate 32 against the hub 3 in a radial direction is performed. In addition, a channel 98a connecting with a plurality of projections which are formed at the inner circumferential edge of the clutch plate 31 are formed at the outer circumferential face of the cylinder-shaped portion 98. In this way, the bushing 93 rotates together with the clutch plate 31 in a body, and can rub the flange 64 of the hub 3 and the cylindershaped portion 59 of the hub flange 18.

Pluralities of cutouts 97a are formed at the cylinder-shaped portion 97. The internal side face of the cylinder-shaped portion 97 in a radial direction touches the outer circumferential face on the first axis side of the cylinder-shaped portion 59 of the hub flange 18. In other words, the hub flange 18 is positioned by the cylindershaped portion 97 of the bushing 93 in a radial direction against the hub 3, the clutch plate 31 and the retaining plate 32.

Pluralities of connecting parts 14 extending toward the first axis side are formed at the outer circumferential edge of the annular portion 94. The connecting parts 14 are formed at equal intervals in a circular direction. The connecting parts 14 have nail like shapes, and are connected with a hole 15 which is formed at the clutch plate 31 as seen in FIG. 4. Thus, the bushing 93 is temporarily connected with the clutch plate 31 in an axial direction.

The bushing 93 mentioned above positions the clutch plate 31 against the hub 3 in a radial direction by touching the outer circumferential face of the boss 62, and generates a hysteresis torque of the first and second steps by a friction face touching each of the flange 64 and the cylinder-shaped part 59. Thus, a single portion has a plurality of functions, resulting in a reduced number of total parts.

When the clutch disk 33 of the input rotary portion 2 is pressed against a flywheel (not shown in the Figures), a torque is input to the clutch disk assembly 1. The torque is then transmitted from the clutch plate 31 and the retaining plate 32 to the first spring 16, the hub flange 18, the spacer 80, the fixing plate 20, the second spring 21 and the bushing 19 in this order. Finally, the torque is output from the hub 3 to a transmission shaft (not shown in the Figures).

When a torque fluctuation from an engine is input to the clutch disk assembly 1, a torsion vibration or relative rotation is caused between the input rotary portion 2 and the hub 3, and the first springs 16, the springs 17 and the second springs 21 are compressed in a rotary direction.

Figure 7:
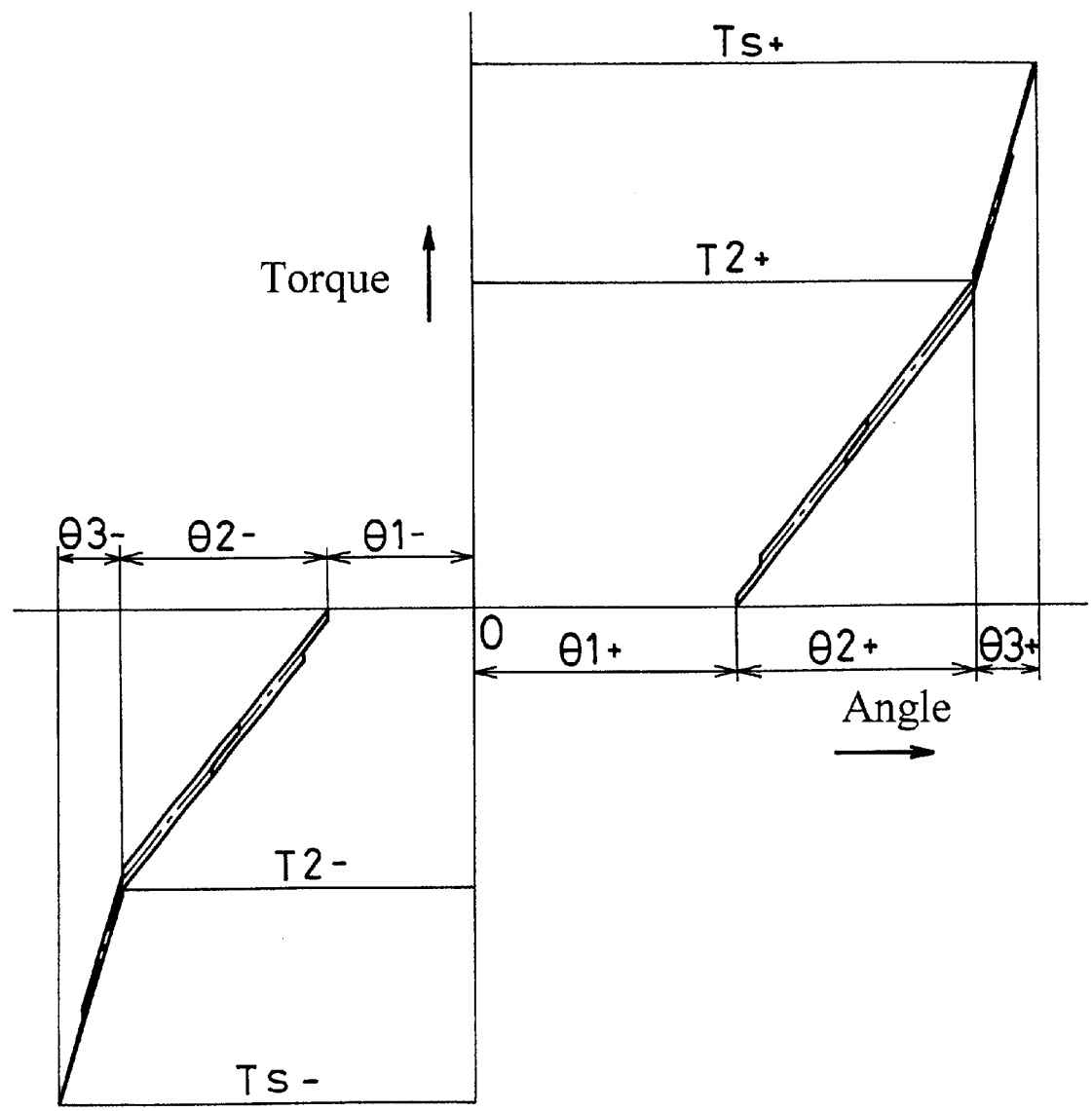
FIG. 7 shows a torsion characteristic curve of the clutch disk assembly in accordance with the present invention.

Referring to a machine circuit in FIG. 6 and a torsion characteristic curve in FIG. 7, an operation of the clutch disk assembly 1 as a dampening mechanism will now be described in more detail. The machine circuit shown in FIG. 6 indicates a schematic view of a dampening mechanism 4 formed between the input rotary portion 2 and the hub 3. In FIG. 6, an operating relation between portions will now be described, for example, when the hub 3 is twisted in a certain direction (for example, R2 direction) against the input rotary portion 2.

When the hub 3 is twisted in a R2 direction against the input rotary portion 2, mainly the second dampening mechanism 6 operates within a range of a torsion angle $\theta_1$. In other words, the second springs 21 are compressed in a rotary direction, causing a rubbing in the second friction mechanism 10. In this case, since a rubbing is not caused in the first friction mechanism 8, a characteristic of a high hysteresis torque can not be obtained. As the result, a characteristic of the first step of a low rigidity and low hysteresis torque is obtained. When the torsion angle is over the torsion angle $\theta_1$, the second stopper 12 touches, resulting in a stop of a relative rotation between the hub 3 and the hub flange 18. In other words, the second dampening mechanism 6 does not operate when the torsion angle is over $\theta_1$. Thus, the second springs 21 are not compressed when the torsion angle is over $\theta_1$. Therefore, the second springs 21 are not likely to be broken. In addition, it is not necessary to consider the strengths of the second springs 21, which leads to an easy design. The first dampening mechanism 5 operates at the second step of a torsion characteristic. In other words, the first springs 16 are compressed in a rotary direction between the hub flange 18 and the input rotary portion 2, resulting in a rubbing in the first friction mechanism 8. As the result, a characteristic of the second step of a high rigidity and high hysteresis torque is obtained. When the torsion angle is over $\theta_1+\theta_2$, the end part of the springs 17 in a circular direction touches the second supporting part 37 of the second receptacle 36. In other words, in the second dampening mechanism 6, the first springs 16 and the springs 17 are compressed in parallel. As the result, a rigidity of the third step is higher than that of the second step. When the torsion angle is $\theta_1+\theta_2+\theta_3$, the first stopper 11 touches, resulting in a stop of a relative rotation between the input rotary portion 2 and the hub 3.

In a negative side of a torsion characteristic, a similar characteristic is obtained although a magnitude of each torsion angle ($\theta_1$, $\theta_2$, and $\theta_3$) is different. At the first step of a torsion characteristic, a friction is generated between the bushing 93 and both the flange 64 of the hub 3 and the external teeth 65. At the second and third steps, a friction is generated between the bushing 93 and the inner circumference of the hub flange 18.

When an abrasion of the bushing 19 progresses at a friction face between the annual portion 89 and the second disk-shaped portion 73 in the second dampening mechanism 6, it is thought that the bushing 19 moves from other portions toward the second axis side. If this happens, a posture of the second corn spring 78 changes, in particular, it arises. As the result, an urging force (setting load) of the second corn spring 78 changes. In particular, it once increases and then decreases. Thus, a magnitude of a hysteresis torque in the second friction mechanism 10 changes and is not stable.

In the present invention, however, the first corn spring 49 urges the fixing plate 20 toward the first axis side, and its urging force is applied to the hub flange 18 and the bushing 93. Therefore, when an amount of abrasion in the second friction mechanism 10 corresponds to or coincides with an amount of abrasion at a friction face between the bushing 93 and the hub flange 18, the following results can be obtained. When a part (the friction portion 95) of the bushing 93 corresponding to the cylinder-shaped part 59 of the hub flange 18 abrades, the hub flange 18, the spacer 80, the fixing plate 20 and the first friction washer 48 all move toward the first axis side corresponding to an amount of the abrasion. As the result, at the friction face in the second friction mechanism 10, the second disk-shaped portion 73 moves toward the first axis side. The location of the bushing 19 against the hub 3 in an axial direction hardly changes. Therefore, a posture of the second corn spring 78 which is disposed between the flange 64 and the bushing 19 hardly changes. Thus, an abrasion following mechanism using the hub flange 18 and the first friction mechanism 8 keeps a posture of the second corn spring 78 constant, regardless of an abrasion at the friction face of the second friction mechanism 10, resulting in a stable generation of a hysteresis torque in the second friction mechanism 10. As the result, a hysteresis torque that shows a small change with the passage of time can be obtained, leading to an improved sound and vibration performance. In addition, since it is not necessary to consider an abrasion margin of the second corn spring 78, the degree of freedom to design the second corn spring 78 increases. In particular, it is possible to design the second corn spring 78 with a low stress and a high load. A set load of the second corn spring 78 is set to be approximately a peak of a load characteristic in a corn spring. When an amount of abrasion in the bushing 19 is kept to be equal to that in the bushing 93, the load of the second corn spring 78 is kept to be approximately a maximum. When an amount of abrasion in the bushing 19 is different from that in the bushing 93, the set load shifts slightly from a peak of a load characteristic to both its side. In this case, an amount of variation of a set load is set so as to be a minimum, in addition its amount is predictable.

ANOTHER EMBODIMENT

Figure 23:
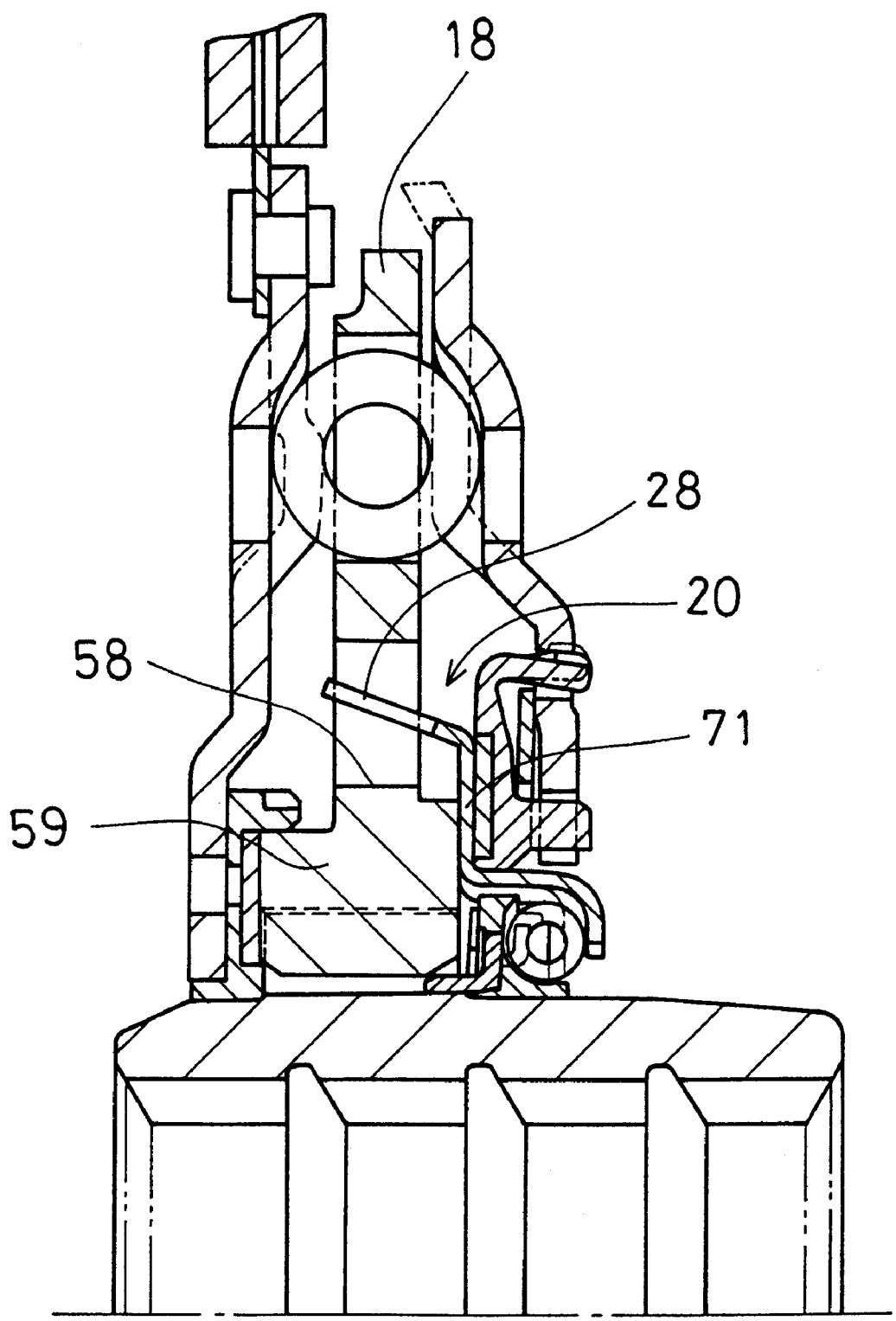
FIG. 23 is a partial cross sectional view of a part of a clutch disk assembly in accordance with another embodiment of the present invention, corresponding to FIG. 3 of the first embodiment.

As shown in FIG. 23, the spacer 80, described in the above embodiment, can be removed, and a fixing plate 20 may be connected directly with a hub flange 18. A first disk-shaped part 71 of a fixing plate 20 is supported directly by a cylinder-shaped part 59 of a hub flange 18. In addition, connecting nails 28 extend from the outer circumferential edge of the first disk-shaped part 71 into connecting holes 58 of the hub flange 18. In this structure, the spacer 80 can be removed, resulting in a small number of parts.

In a machine circuit in FIG. 6, other elastic portion or a spring may be disposed at a location of a spacer 80. In that case, four steps of characteristic can be obtained. In a description of the present embodiment, such a phrase as "connect so as to rotate in a body" and "connect relatively unrotatably" means that both portions are disposed so as to be able to transmit a torque in a circular direction. In other words, it also contains a condition in which a gap is formed in a rotary direction between both portions and a torque is not transmitted between both portions within a predetermined angle.

In both embodiments, the dampening disk assembly of the present invention has first and second friction mechanisms that rub a common member, which is common to both of them. Thus, since the two friction mechanisms rub against a common member, it is easy to control a magnitude of a friction generated at a friction face.

ANOTHER EMBODIMENT

Figure 24:
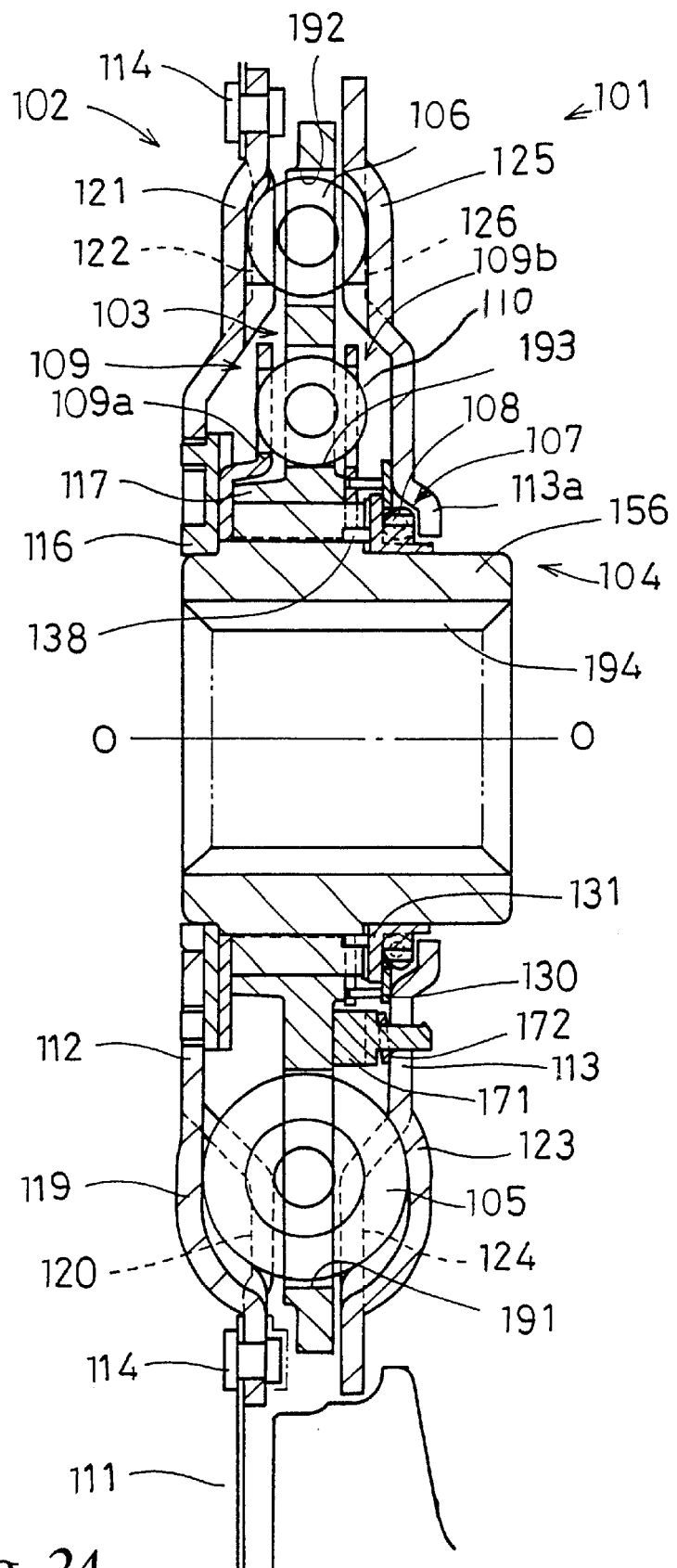
FIG. 24 is a schematic cross section of a clutch disk assembly of an second embodiment of the invention.
Figure 25:
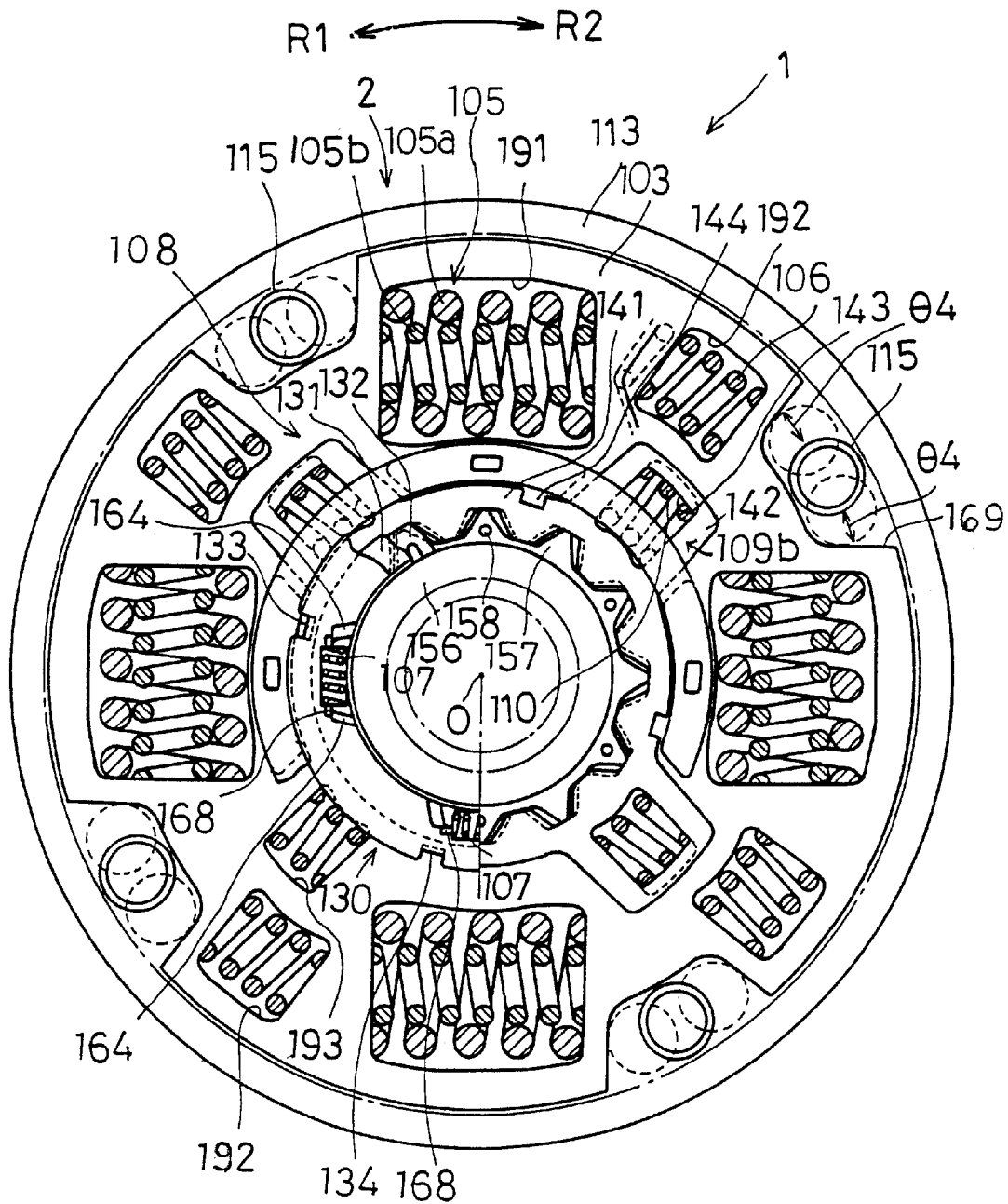
FIG. 25 is a plan view of the clutch disk assembly with a plate removed.

FIGS. 24 and 25 show a clutch disk assembly 101 of an embodiment of the invention. The clutch disk assembly 101 is used in a clutch of a vehicle. A flywheel (not shown) is arranged on the left side of the clutch disk assembly 101 in FIG. 24, and a transmission (not shown) is arranged on the right side in FIG. 24. In the following description, the left side in FIG. 24 is referred to as a "first axial side", and the right side in FIG. 24 is referred to as a "second axial side". The line O—O in FIG. 24 represents a rotation axis of the clutch disk assembly 101. The arrow R1 in FIG. 25 indicates a direction of rotation of the flywheel and the clutch disk assembly 101, and the arrow R2 indicates a reverse direction.

The clutch disk assembly 101 is basically formed of an input rotary member 102, an intermediate body 103, an output rotary member 104, third springs 105, fourth springs 106, second springs 110 and a damper 108. The input rotary member 102 is a member receiving a torque from the flywheel (not shown). The output rotary member 104 in this embodiment is a hub. The output rotary member 104 is mounted on a splined shaft (not shown) extending from the transmission. The output rotary member 104 is relatively unrotatably relative to the shaft, but is axially movable on the shaft (not shown) extending from the transmission. The intermediate body 103 is arranged between the input rotary member 102 and the output rotary member 104. The third and fourth springs 105 and 106 are provided for circumferentially and elastically coupling the input rotary member 102 and the intermediate body 103 together. The damper 108 is a mechanism provided for circumferentially and elastically coupling the intermediate body 103 and the output rotary member 104 together, and has a plurality of first springs 107 as seen in FIG. 25.

Structures of various portions of the clutch disk assembly 101 will now be described below in more detail. The input rotary member 102 is basically formed of a friction portion 111 (clutch disk), a first retaining plate 112 and a second retaining plate 113.

The friction portion 111 is an annular member disposed near a friction surface of the flywheel. The friction portion 111 is basically formed of a pair of facings and a cushioning plate.

First and second plates 112 and 113 are circular or annular members, which are axially spaced from each other by a predetermined distance. The outer peripheral portions of the first and second plates 112 and 113 are fixedly coupled together by a plurality of pins 115, which are circumferentially spaced from each other. Thereby, the first and second plates 112 and 113 are spaced apart from each other by a constant axial distance. Moreover, the first and second plates 112 and 113 rotate together. The cushioning plate of the friction portion 111 is fixedly coupled to the outer peripheral portion of the first plate 112 by rivets 114.

As seen in FIG. 24, the first plate 112 is provided with several first receiver portions 119, which are circumferentially equally spaced from each other. Each first receiver portion 119 is slightly deformed or expanded in the axial direction such that it extends with an arcuate shape in the axial direction. Adjacent to each end of each first receiver portion 119 is a first contact portion 120 at circumferentially opposite ends thereof. The first contact portions 120 are circumferentially opposed to each other. The first plate 112 is provided with a plurality of second receiver portions 121, which are arranged in the circumferential direction. Each second receiver portion 121 has an arcuate contour slightly extending toward the first axial side. Second contact portions 122 are formed at each circumferentially opposite end of each second receiver portions 121. The second contact portions 122 are circumferentially opposed to each other.

The second plate 113 is provided with a plurality of first receiver portions 123 which are circumferentially equally spaced from each other. The first receiver portions 123 are formed correspondingly to the first receiver portions 119, respectively, and each have first contact portions 124 at its circumferentially opposite ends thereof. The second plate 113 is further provided with a plurality of second receiver portions 125, which are arranged in the circumferential direction. The second receiver portions 125 are formed correspondingly to the second receiver portions 121, respectively, and each have second contact portions 126 at its circumferentially opposite ends thereof The first receiver portions 119 and 123 are longer in the circumferential and radial directions than the second receiver portions 121 and 125.

An annular bushing 116 is arranged on the inner periphery of the first plate 112. The bushing 116 is carried rotatably on the outer peripheral surface of a hub 156 of the output rotary member 104. Thereby, the input and output rotary members 102 and 104 are radially positioned with respect to each other. The bushing 116 is in contact with the surfaces, on the first axial side, of outer teeth 157, which will be described below.

The intermediate body 103 is a circular or annular member disposed axially between the first and second plates 112 and 113. The intermediate body 103 is larger in axial thickness than the first and second plates 112 and 113. The intermediate body 103 is provided with circumferentially extended first windows or apertures 191 as shown in FIG. 25. The first windows 191 are arranged in locations correspondingly to the first receiver portions 119 and 123 in the retaining plates 112 and 113, respectively. The intermediate body 103 is further provided with a plurality of second windows 192, which are arranged in the circumferential direction. The second windows 192 are arranged correspondingly to the second receiver portions 121 and 125.

The third springs 105 are accommodated in the first windows 191, respectively. Each of the third springs 125 is a combination of large and small coil springs 105a and 105b as seen in FIG. 25. The circumferentially opposite ends of each third springs 105 are in contact with the circumferentially opposite ends of the first window 191 and the first contact portions 120 and 124 of the plates 112 and 113. The third springs 105 are prevented from moving radially outward and axially outward by the receiver portions 119 and 123.

The fourth springs 106 are arranged in the second windows 192, respectively. Each of the fourth springs 106 is a coil spring as can be seen from FIG. 25. The circumferentially opposite ends of the fourth spring 106 are in contact with the circumferentially opposite ends of the corresponding second window 192. The circumferentially opposite ends of the fourth spring 106 are spaced from the contact portions 122 and 126 by torsion angles of $(\theta_3-\theta_2)$, respectively, as seen in FIG. 25.

The intermediate body 103 is provided at its outer periphery with a plurality of circumferentially arranged recesses 169. Each recess 169 extends in the circumferential direction, and the pins 115 extend through the recesses 169, respectively. Each pin 115 is spaced from each of the circumferentially opposite ends of the corresponding recess 169 by a fourth torsion angle of $(\theta_4-\theta_2)$, as seen in FIG. 25.

The intermediate body 103 is also provided with third windows 193, which are located between the neighboring first windows 191 and radially inside the second windows 192. Each third window 193 has a nearly rectangular form extending in the circumferential direction.

As seen in FIG. 24, the intermediate body 103 has a cylindrical portion 117 at its inner peripheral portion. The cylindrical portion 117 extends axially toward the first axial side. The cylindrical portion 117 is provided with a plurality of first inner teeth 145 projected radially inward. Each first inner tooth 145 has an R1-side surface 171 on its forward side in the rotating direction R1, and has an R2-side surface 172 on its rearward side.

Figure 28:
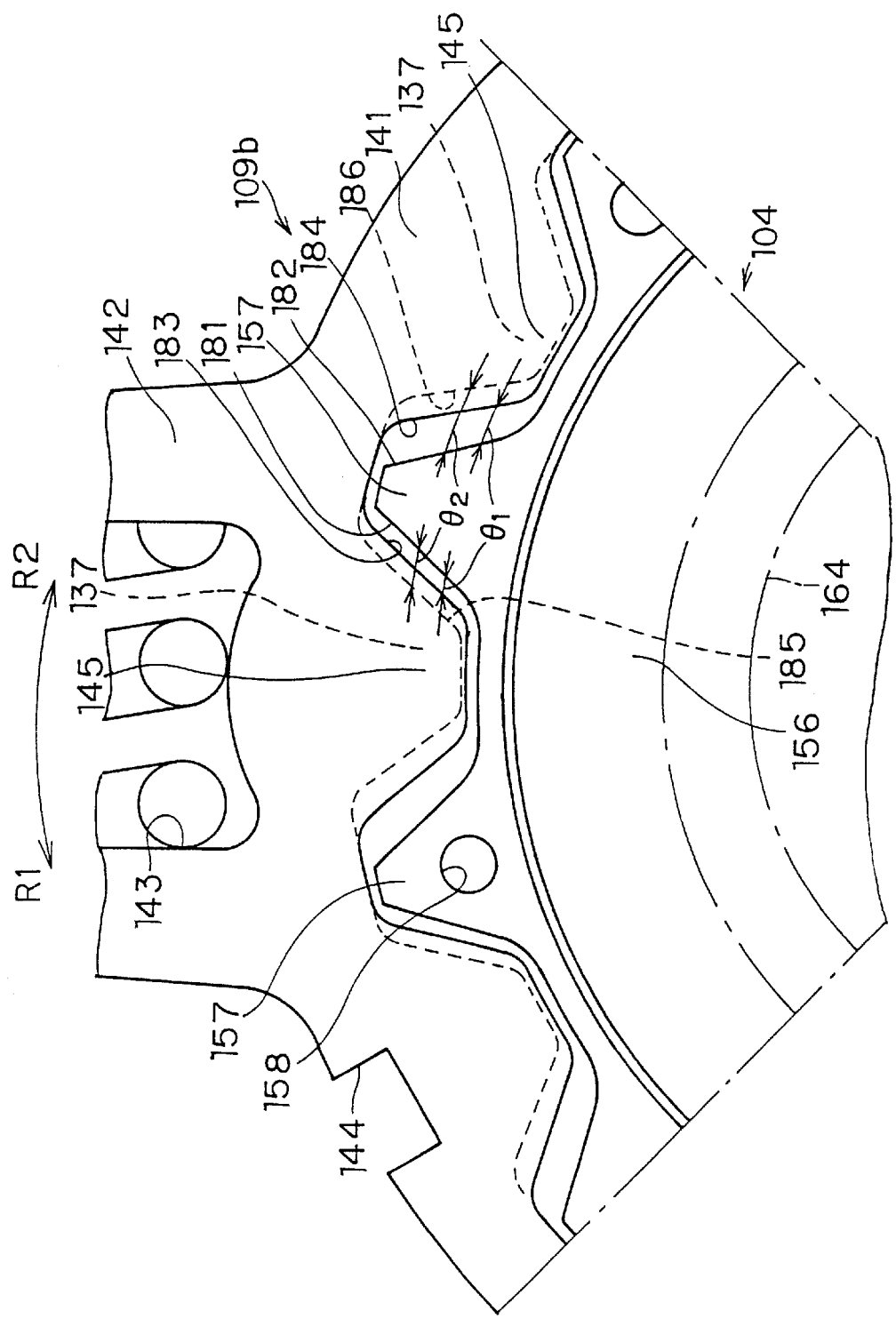
FIG. 28 is a fragmentary plan showing structures of an output rotary member, an intermediate body, an intermediate member and a stop.

The output rotary member 104 is basically formed of a cylindrical boss 156 extending in the axial direction. The boss 156 extends through the central apertures of the first and second plates 112 and 113. The boss 156 is provided at its inner periphery with a plurality of spline grooves 194. The boss 156 is provided with a plurality of outer teeth 157 projected radially outward, as seen in FIG. 25. The boss 156 is provided with an annular flange portion having a short radial length and located between the outer teeth 157. The outer teeth 157 are arranged correspondingly to the cylindrical portion 117. Each outer tooth 157 extends between the circumferentially neighboring second inner teeth 137, and is circumferentially spaced from each neighboring tooth 137 by a predetermined angle. As seen in FIG. 28, each outer tooth 157 is provided at its forward side in the rotating direction R1 with an R1-side surface 181, and is provided at its rearward side with an R2-side surface 182. Apertures 158 having a predetermined depth are formed in surfaces, on the second axial side, of the outer teeth 157 at alternating positions.

The intermediate member 109 is formed of a pair of plates 109a and 109b. The plate 109a is arranged between inner peripheral portions of the first plate 112 and the intermediate body 103. The plate 109a is an annular member, which is formed of an annular portion 141 with a plurality of projected portions 142 extending outwardly from the annular portion 141. The projected portions 142 are provided with windows 143 arranged correspondingly to the third windows 193 in the intermediate body 3, respectively. The annular portion 141 of the plate 109a extends between the bushing 116, which is rigidly fixed to the first plate 112, and the cylindrical portion 117 of the intermediate body 103.

As seen in FIGS. 24 and 28, the plate 109b is disposed between the inner peripheral portions of the intermediate body 103 and the second plate 113. The plate 109b is also basically formed of an annular portion 141 and a plurality of projected portions 142 projected radially outward from the annular portion 141. The projected portions 142 are formed correspondingly to the third windows 193 in the intermediate body 103. The projected portions 142 are provided with windows 143. Each second spring 110 is accommodated in the third window 193 of the intermediate body 103 and the windows 143 of the plates 109a and 109b. The plates 109a and 109b restrict the radially outward and axially outward movement of the second springs 110. The plate 109b differs from plate 109a in that the annular portion 141 and the projected portions 142 are flat, and the annular portion 141 is in contact with the surface of the cylindrical portion 117 on the second axial side.

The annular portions 141 of plates 109a and 109b are provided at their inner peripheries with a plurality of first inner teeth 145. The first inner teeth 145 are arranged correspondingly to the plurality of second inner teeth 137, respectively. The first inner teeth 145 are located circumferentially between the outer teeth 157. Each first inner tooth 145 is circumferentially wider than the second inner tooth 137, and therefore extends in the circumferentially opposite directions beyond the second inner tooth 137. Each first inner tooth 145 is provided at its forward side in the rotating direction R1 with an R1-side surface 184, and is also provided at its rearward side with an R2-side surface 183.

A space of the first torsion angle $\theta$ is kept between each outer tooth 157 and each of the first inner teeth 145 circumferentially neighboring thereto. More specifically, the space of the first torsion angle theta1 is kept between the R1-side surface 181 of the outer tooth 157 and the R2-side surface 183 of the first inner tooth 145, and is also kept between the R2-side surface 182 of the outer tooth 157 and the R1-side surface 184 of the first inner tooth 145.

A space of the second torsion angle $\theta_2$ is formed between each outer tooth 157 and each of the second inner teeth 137 circumferentially neighboring thereto. More specifically, the space of the second torsion angle $\theta_2$ is formed between the R1-side surface 181 of the outer tooth 157 and the R2-side surface 185 of the second inner tooth 137, and is also kept between the R2-side surface 182 of the outer tooth 157 and the R1-side surface 186 of the second inner tooth 137.

On each of the circumferentially opposite sides of the outer tooth 157, the second torsion angle $\theta_2$ is larger than the first torsion angle $\theta_1$. The first torsion angle $\theta_1$ on the R2 side of the outer tooth 157 is larger than that on the R1 side with the clutch disk assembly in a torsion free state. The second torsion angle $\theta_2$ on the R2 side of the outer tooth 157 is larger than that on the R1 side. It should be understood that when referring to the angle $\theta_1$ the inventors are referring to the combination of the angles $\theta_1$ defined on each side of the tooth. Similarly, when referring to the angle $\theta_2$ the inventors are referring to the combination of the two angles $\theta_2$ on each side of the tooth, since when there is relative rotation between the various parts, the specific angle on one side of the tooth diminishes in size while the corresponding angle on the opposite side of the tooth increases in size due to the relative rotation.

The outer teeth 157, first inner teeth 145 and second inner teeth 137 are formed continuously on corresponding surfaces throughout the surfaces' entire circumferences. In other words, these teeth are formed uniformly about the circumference of respective surfaces of the hub and plate members 112 and 113. As a result, contact areas of the outer teeth 157 with respect to the first and second inner teeth 145 and 137 can be large, and therefore the surface pressure per square inch can be small so that wear and breakage can be suppressed.

The foregoing fourth torsion angle $\theta_4$ is larger than the third torsion angle $\theta_3$, and each of the third and fourth torsion angles $\theta_3$ and $\theta_4$ is larger than the second torsion angle $\theta_2$. The intermediate member 109 is arranged to cooperate with the second springs 110 to transmit a torque between the output rotary member 104 and the intermediate body 103. The plate 109b is provided at its outer periphery with a plurality of recesses 144 as shown in FIG. 28. The recesses 144 form engagement portions for the damper 108, which will be described below.

Figure 26:
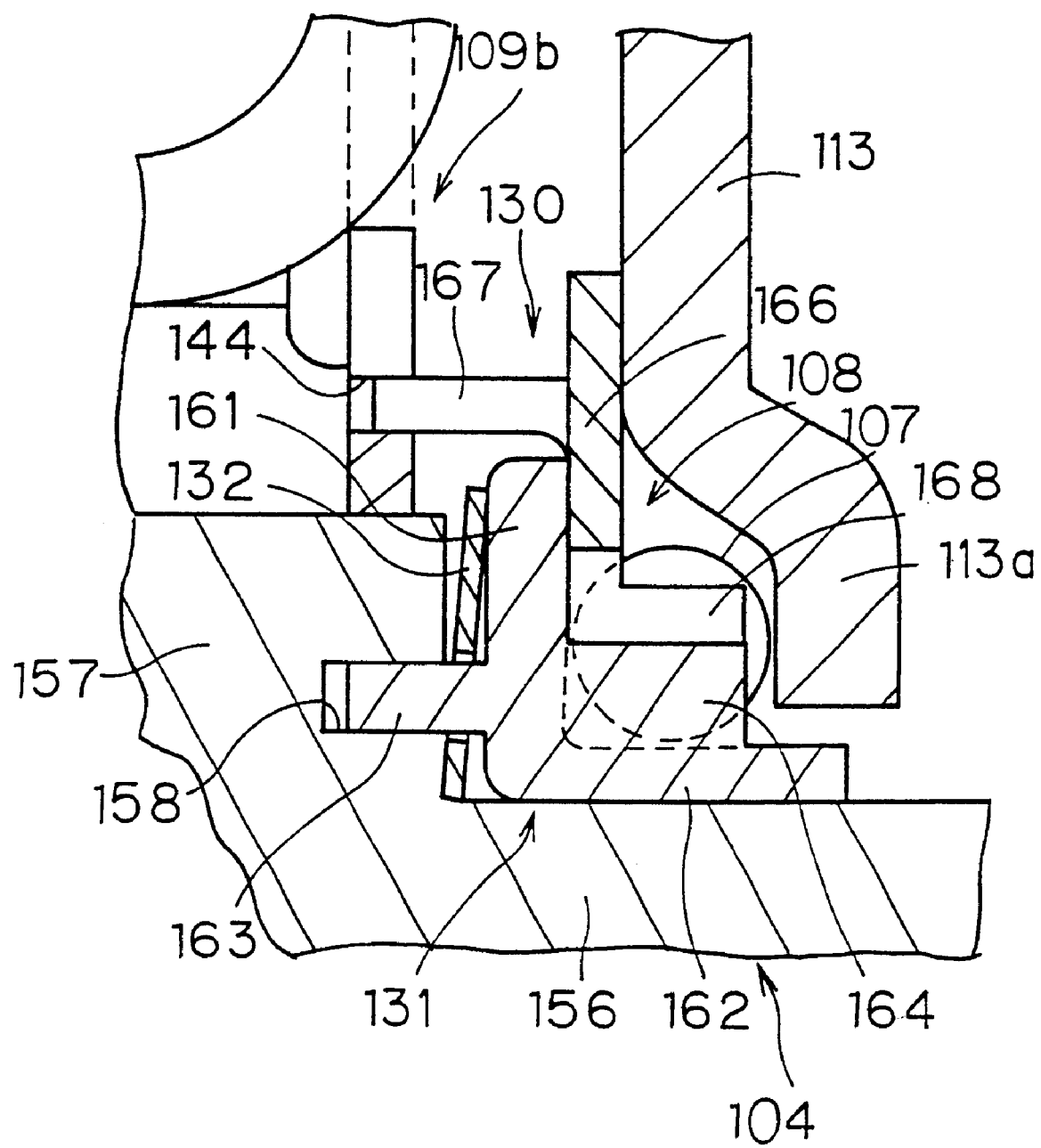
FIG. 26 is a cross section showing, on an enlarged scale, a damper in FIG. 24.
Figure 27:
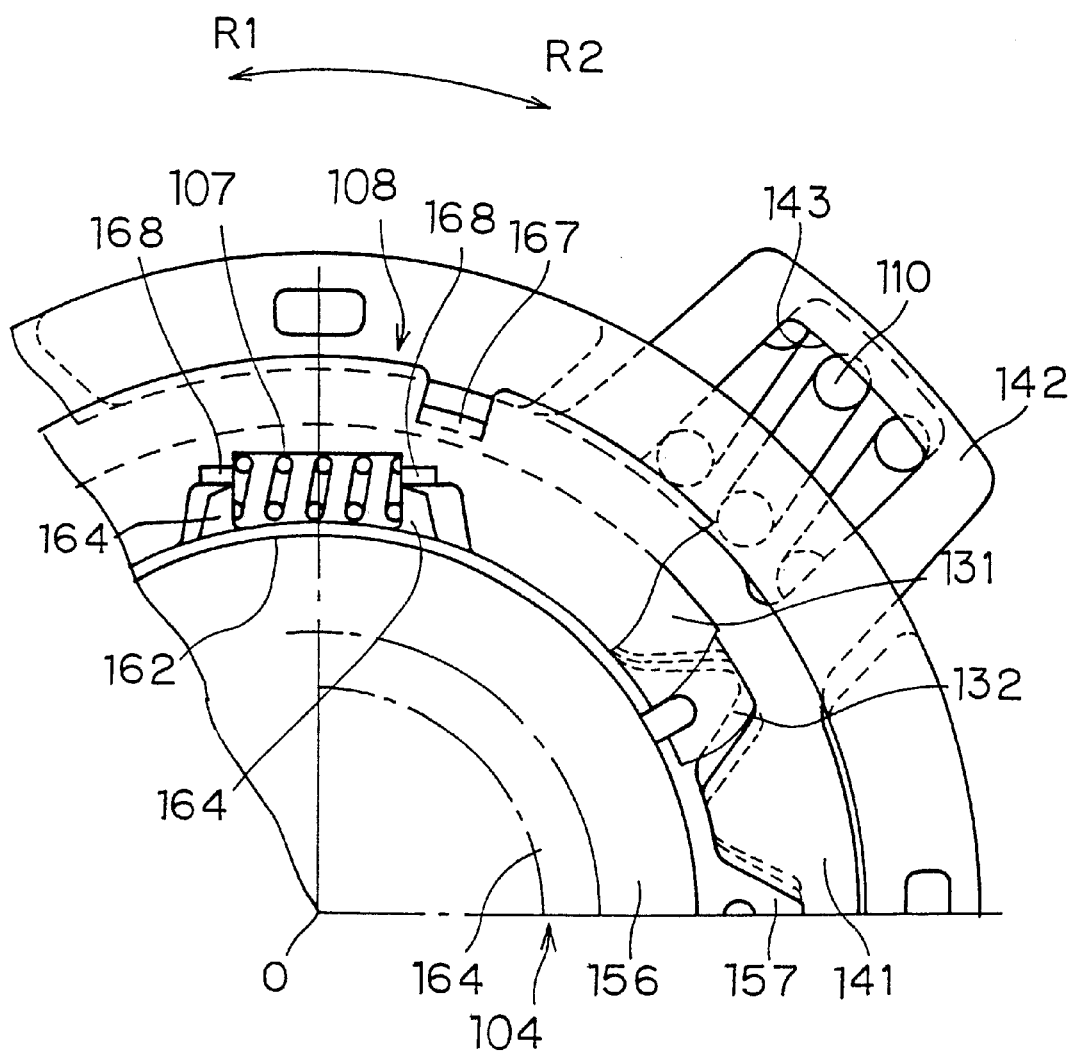
FIG. 27 is a fragmentary plan view showing a structure of the damper.

The damper 108 will now be described below. The damper 108 is provided for transmitting a torque between the output rotary member 104 and the intermediate member 109 and for absorbing and damping a torsional vibration. As seen in FIG. 26, the damper 108 is formed of a first member 130, a second member 131 and the first springs 107. The first springs 107 are circumferentially compressible between the first and second members 130 and 131 in response to relative rotation between the output rotary member 104 and the intermediate member 109. The damper 108 is disposed between the outer teeth 157 and the second plate 113, and therefore is also adjacent to the cylindrical portion 117 and the radially inner portion of the plate 109b. Thus, the damper 108 is axially shifted from the connection between the outer teeth 157 and the second inner teeth 137. Therefore, the contact area of the outer teeth 157 with respect to the first and second inner teeth 145 and 137 can be sufficiently large.

The first member 130 of the damper 108 is an annular plate which is disposed axially between the plate 109b and the second plate 113. The first member 130 functions as an input member in the damper 108, and rotates together with the plate 109b. More specifically, the first member 130 includes an annular main portion 166. The first member 130 also includes a plurality of engagement portions 167, which are formed on the outer periphery of the main portion 166 and are bent toward the first axial side. Each engagement portion 167 extends axially through one recess 144 of plate 109b, and has the circumferentially opposite ends in contact with the edges of the recess 144. The main portion 166 is provided at its inner periphery with a plurality of recesses which are circumferentially equally spaced from each other. Engagement portions 168, which are formed by partially cutting and bending portions toward the second axial side, are formed at circumferentially opposite sides of the outer peripheral portion of the recess.

The second member 131 functions as an output member in the damper 108, and rotates together with the output rotary member 104. More specifically, the second member 131 has an annular form, and is made of, e.g., resin or the like. The second member 131 is disposed radially inside the first member 130. The second member 131 is basically formed of a circular plate portion 161 and a cylindrical portion 162 extending from the inner periphery of the circular plate portion 161 toward the second axial side. The side surface, on the second axial side, of the radially outer portion of the circular plate portion 161 is in contact with the radially inner portion of the surface, on the first axial side, of the main portion 166 of the first member 131. The inner peripheral surface of the cylindrical portion 162 is in contact with the outer peripheral surface of the boss 156.

A conical spring 132 is arranged between the circular plate portion 161 and the outer teeth 157. The conical spring 132 is axially compressed between the outer teeth 157 and the circular plate portion 161, and biases the circular plate portion 161 toward the second axial side. Consequently, the radially outer portion of the circular plate portion 161 biases the radially inner portion of the main portion 166 of the first member 131 toward the second axial side, and the side surface, on the second axial side, of the radially outer portion of the main portion 166 is in contact with the side surface of the radially inner portion of the second plate 113. In other words, the second plate 113 axially supports the first member 130.

A plurality of engagement portions 163 projects toward the first axial side from the circular plate portion 161. The engagement portions 163 extend through apertures formed in the conical spring 132, and are engaged with the apertures 158 formed in the outer teeth 158, respectively. Thereby, the second member 131 can rotate together with the output rotary member 104. The engagement portions 163 are axially movably fitted into the apertures 158, respectively. Consequently, the second member 131 is relatively unrotatably and axially movably engaged with the output rotary member 104.

A plurality of contact portion pairs 164, which are circumferentially equally spaced from each other, are formed on the radially inner portion of the circular plate portion 161 around the cylindrical portion 162. The contact portions 164 in each of the pairs are formed to correspond to the engagement portions 168, respectively, and are circumferentially spaced from each other.

The first spring 107 is a coil spring having the lowest rigidity, and is disposed between the first and second members 130 and 131. Each first spring 107 is disposed between the paired contact portions 164 of the second member 131. Therefore, the first axial side of the first spring 107 is supported by the circular plate portion 161 of the second member 131, and the inner periphery thereof is supported by the cylindrical portion 162. The circumferentially opposite ends of the first spring 107 are engaged with the contact portions 168 and 164. Owing to the above structures, the first spring 107 is circumferentially compressed between the first and second members 130 and 131 when these members 130 and 131 rotate relatively to each other. More specifically, the first spring 107 is compressed between one of the paired contact portions 168 on one side and one of the paired contact portions 164 on the opposite side.

When the first and second members 130 and 131 rotate relatively to each other, a frictional resistance occurs between the first and second members 130 and 131, which are pressed against each other by the conical spring 132. In this structure, the first and second members 130 and 131 functioning as the input and output members generate the frictional resistance so that additional members typically found in the prior art are not required for producing the frictional resistance. Therefore, the number of the parts can be reduced, and the damper 108 has a simple structure.

The second plate 113 has an inner peripheral portion 113a, which is curved toward the second axial side. The inner peripheral portion 113a is extended to a position near the second axial side of the first spring 107 and the outer peripheral surfaces of the cylindrical portion 162 and the boss 156. Thereby, the second axial sides of the first springs 107 are carried by the inner peripheral portion 113a. As described above, the second plate 113 supports the second axial side of the damper 108. More specifically, the first member 130 is carried by the main portion of the second plate 113, and the first springs 117 are supported by the inner peripheral portion 113a. As a result, the number of parts can be small, and the structure can be simple.

The structure employing the conical spring 132 for biasing can be simple and can achieve an excellent effect.

A friction member 171 has an annular form, and is in contact with the inner peripheral portion of the surface, on the second axial side, of the intermediate body 103. A biasing member 172 biases the friction member 171 toward the intermediate body 103. The friction member 171 has engagement arms 173, which are relatively unrotatably engaged with the second plate 113.

Among the various kinds of circumferentially compressible springs, the first spring 107 has the smallest spring constant. The second spring 110 has the spring constant smaller than that of the third spring 105, and the fourth spring 106 has the largest spring constant.

The damper 108 can be handled as one unit when attaching the same to the plate 109b and the output rotary member 104 from the second axial side. For this attachment, the conical spring 132 is attached to the second member 131, and the first and second members 130 and 131 are engaged with each other in advance. After this pre-assembly, the first springs 107 are attached between the first and second members 130 and 131. The damper 108 thus completed as the single unit is moved toward the output rotary member 104 and the plate 109b. The engagement portions 167 are fitted into the recesses 144, and the engagement portions 163 are fitted into the apertures 158, respectively. In this manner, the damper 108 can be handled as the single unit and can be attached from one axial side so that the assembly steps can be simple.

Figure 29:
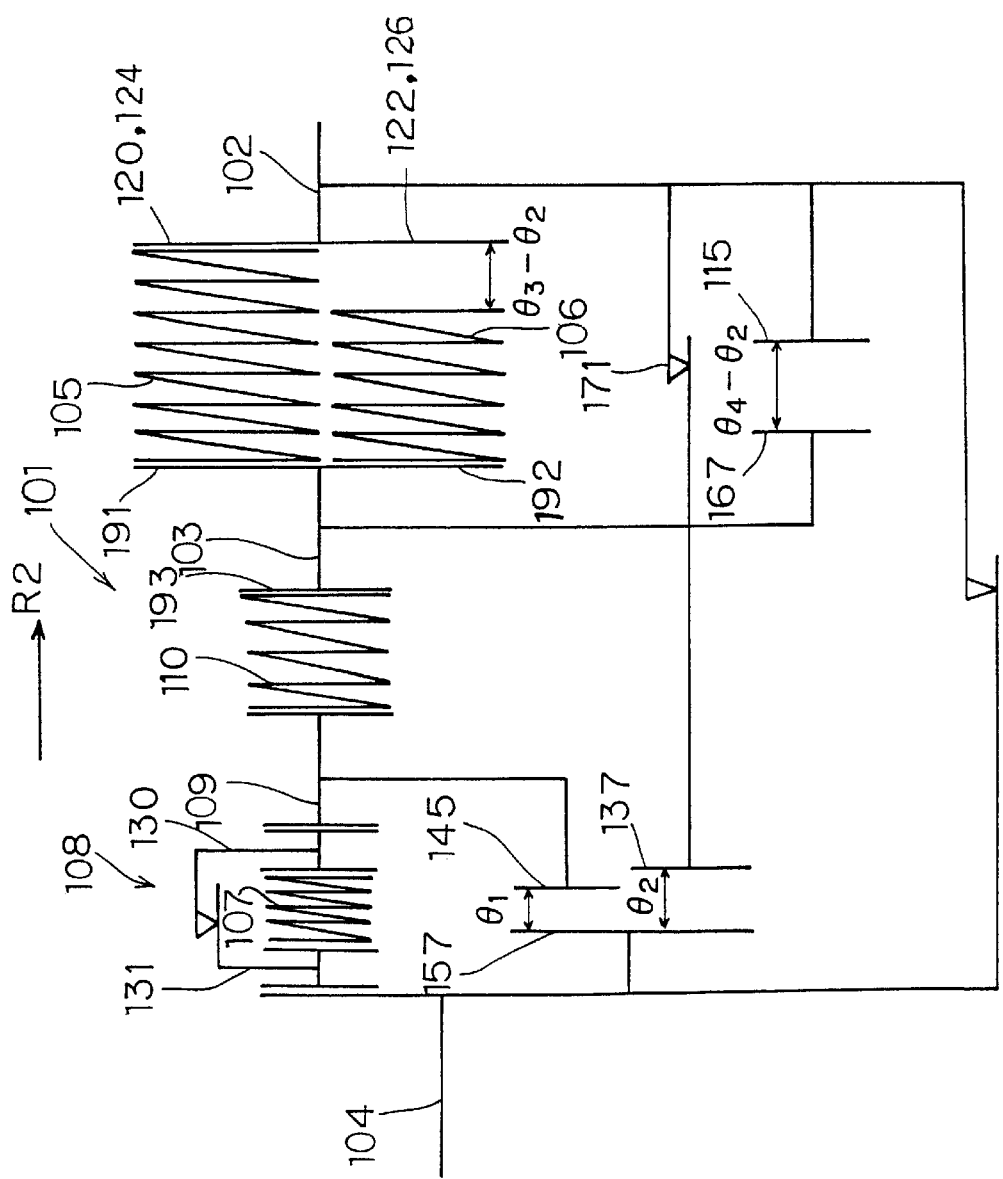
FIG. 29 is a mechanical circuit diagram of the clutch disk assembly.

Referring now to FIG. 29, a mechanical circuit diagram of the damper mechanism of the clutch disk assembly 101 is illustrated. This figure represents relationships between the various members during the operation of the damper mechanism in one direction. As can be seen from FIG. 29, even if the damper 108 were not arranged in the clutch disk assembly 101, the clutch disk assembly would produce the first stage of the characteristics without the operation of the spring and the friction mechanism until the torsion angle $\theta_1$. Thus, the clutch disk assemblies 101 can be manufactured with and without the damper 108 depending on the required characteristics.

When the friction portion 111 of the input rotary member 102 is pressed against the flywheel (not shown), the clutch disk assembly 101 is supplied with a torque. The torque is transmitted successively through the first and second plates 112 and 113, third springs 105, intermediate body 103, second springs 110, intermediate member 109 and damper 108, and is finally transmitted from output rotary member 104 to the shaft (not shown). In the damper 108, the torque is transmitted from the first member 130 to the second member 131 through the first springs 107.

When a torque variation of the engine is transmitted to the clutch disk assembly 101, torsional vibration, i.e., relative rotation occurs between the input rotary member 102 and the output rotary member 104 so that the third, fourth, second and first springs 105, 106, 110 and 107 are compressed.

Figure 30:
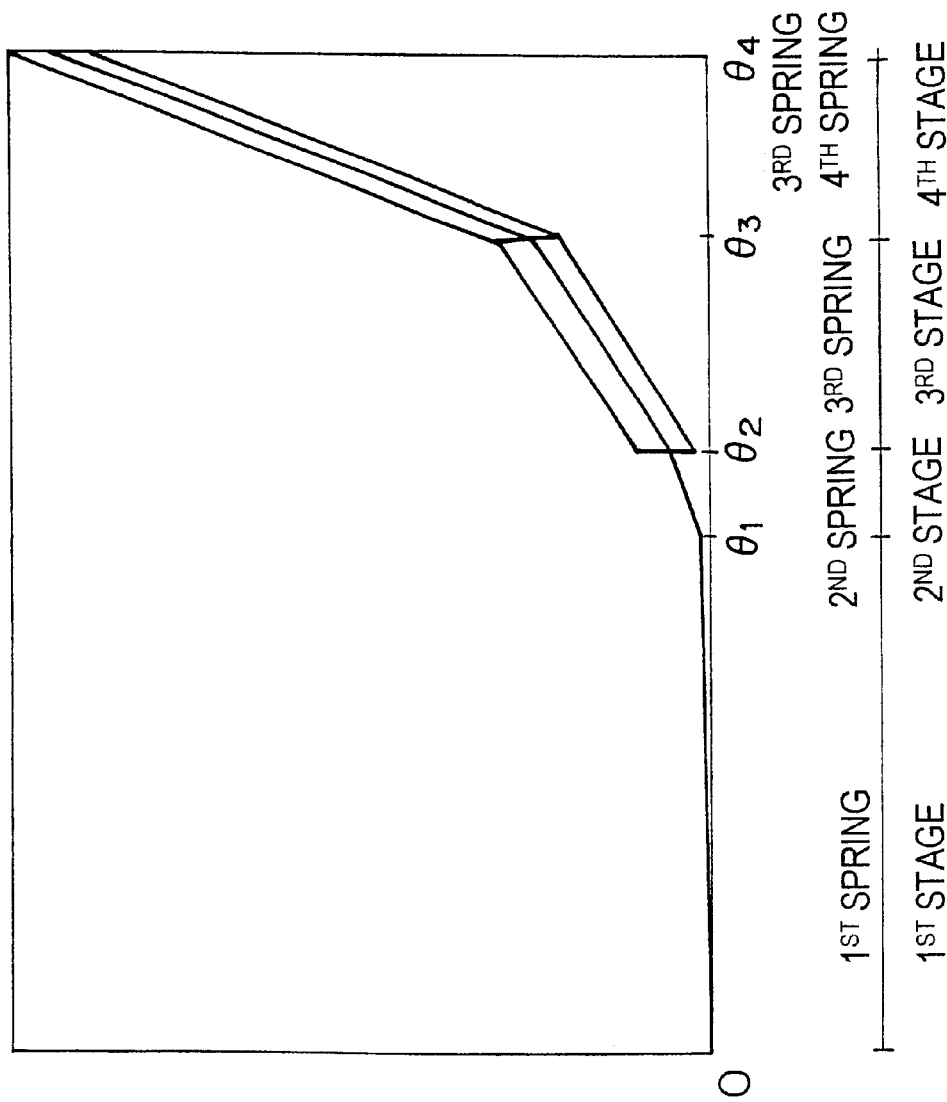
FIG. 30 is a diagram showing torsion characteristics of the clutch disk assembly.

The operation of the clutch disk assembly 101 will now be described below with reference to a characteristic diagram of FIG. 30. In the following description, it is assumed that the input rotary member 102 is fixedly coupled to another stationary device, and the output rotary member 104 is twisted in the rotating direction R2 relatively to the input rotary member 102.

Before the outer teeth 157 come into contact with the first inner teeth 145 and therefore the torsion angle is smaller than the first torsion angle $\theta_1$, the first springs 107 in the damper 108 are primarily compressed in the circumferential direction so that a characteristic of a low rigidity is exhibited. In this stage, a small frictional resistance occurs between the first and second members 130 and 131. When the torsion angle increases to the first torsion angle $\theta_1$, the outer teeth 157 come into contact with the first inner teeth 145, and the relative rotation between the output rotary member 104 and the intermediate body 103 stops. Consequently, the first springs 107 are no longer compressed. In the second stage, when the torsion angle is between the first and second torsion angles $\theta_1$ and $\theta_2$, the second springs 110 are circumferentially compressed between the intermediate member 109 and the intermediate body 103. In this stage, a rigidity higher than that in the first stage is exhibited.

When the torsion angle increases to the torsion angle $\theta_2$, the outer teeth 157 come into contact with the second inner teeth 137, and the second springs 110 are no longer compressed. Thus, the relative rotation between the output rotary member 104 and the intermediate body 103 stops, and thereafter the relative rotation further occurs with respect to the input rotary member 102. Therefore, the third springs 105 are compressed in a third stage, and sliding occurs between the intermediate body 103 and the friction member 171. As a result, a characteristic of a high rigidity and a low hysteresis torque is exhibited in the third stage where the torsion angle is between the second and third torsion angles $\theta_2$ and $\theta_3$ as indicated in FIG. 30. The fourth springs 106 start to be compressed at the third torsion angle $\theta_3$ in a fourth stage, and thereafter the fourth and third springs 106 and 105 are compressed in parallel so that a characteristic of a further increased rigidity is exhibited. When the pins 115 come into contact with the edges of recesses 169 at the fourth torsion angle $\theta_4$, respectively, the relative rotation between the output rotary member 104 and the input rotary member 102 stops.

As described above, the clutch disk assembly 101 can exhibit the torsion characteristics having the first to fourth stages, and therefore can appropriately absorb and dampen different kinds of vibrations. In particular, the characteristic of a low rigidity and a small hysteresis torque is exhibited in the first stage smaller than the first torsion angle $\theta_1$. Therefore, gear noises during idling are suppressed. The characteristics of a middle rigidity is exhibited in the intermediate region from the first torsion angle $\theta_1$ to the second torsion angle $\theta_2$, i.e., in the intermediate region between the first and second stages. Therefore, the jumping phenomenon is suppressed.

Since the first springs 107 operate only in the first stage of the torsion characteristics, and are not compressed in the second stage. The second springs 110 are compressed only in the second stage of the torsion characteristics, and are not compressed in the third stage. In this manner, the springs for first stage and the springs for the second stage are compressed only in the intended stages, and are not compressed in the higher stages. Therefore, fatigue, breakage and others of the springs 107 and 110 are suppressed.

The invention may be employed in power transmitting devices other than the clutch disk assembly.

According to the damper disk assembly of the invention, the damper having the first elastic members, which function as the springs for the first stage in the torsion characteristics, is disposed at the position axially shifted from the first circular plate member. Therefore, a sufficiently large contact area can be ensured between contact portions of the hub and the first circular plate member.

In a dampening disk assembly in accordance with the present invention, since a second elastic portion is not supported by a conventional hub and an intermediate plate, but by a first and second portions which are different from the conventional hub and the intermediate plate, it is possible to use a portion which is easy to make. In addition, in this dampening disk assembly a friction face is formed between the first and second portions, resulting in reduction of the number of parts.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dampening disk assembly comprising:
   first and second input plates;
   an intermediate plate disposed between said first and second input plates,
   a first elastic member elastically coupling said first and second input plates and said intermediate plate in a rotary direction;
   an output hub disposed on inner circumferential sides of said first and second input plates and said intermediate plate; and
   a dampening mechanism located between said output hub and said intermediate plate, said dampening mechanism elastically coupling said output hub and said intermediate plate in a rotary direction, said dampening mechanism including
      a first member non-rotatably coupled with an outer circumference of said output hub and axially movably with respect to said output hub, said first member having a first friction face and a first supporting part on one of the axial surfaces thereof,
      a second member coupled to rotate with said intermediate plate, said second member having a second friction face contacting said first friction face and a second supporting part corresponding to said first supporting part,
      a second elastic member located between and supported by said first and second supporting parts to elastically couple said first and second members in a rotary direction, and
      an urging member disposed between said hub and said first member to urge said first friction face of said first member and said second friction face of said second friction member towards each other.

2. A dampening disk assembly as set forth in claim 1, wherein
   said first member includes an annular main body constructed of a resin material, said annular main body formed with said first friction face and said first supporting part arranged in the circumferential direction.

3. A dampening disk assembly as set forth in claim 1, wherein
   said first member has a protrusion extending axially from said annular main body, said protrusion connected with a flange of said output hub in a relatively non-rotatably and axially movable manner.

4. A dampening disk assembly as set forth in claim 2, wherein
   said annular main body is formed with a recess on an axial surface axially opposite said protrusion, said recess axially corresponding to said first friction face.

5. A dampening disk assembly comprising:
   first and second input plates;
   an intermediate plate disposed between said first and second input plates;
   a first elastic member elastically coupling said first and second input plates and said intermediate plate in a rotary direction;
   an output hub disposed on inner circumferential sides of said first and second input plates and said intermediate plate; and
   a dampening mechanism located between said output hub and said intermediate plate, said dampening mechanism elastically coupling said output hub and said intermediate plate in a rotary direction, said dampening mechanism including
      a first member non-rotatably, coupled with an outer circumference of said output hub and axially movable with respect to said output hub, said first member including an annular main body constructed of a resin material, said annular main body formed with a first friction face and first supporting part arranged in a circumferential direction on one of the axial surfaces thereof,
      a second member coupled to rotate with said intermediate plate, said second member having a second friction face contacting said first friction face and a second supporting part corresponding to said first supporting part, and
      a second elastic member located between and supported by said first and second supporting parts to elastically couple said first and second members in a rotary direction.

6. A dampening disk assembly as set forth in claim 1, wherein
   said second member has a protrusion extending axially, said protrusion connected with said intermediate plate in a relatively non-rotatably and axially movable manner.

7. A dampening disk assembly as set forth in claim 3, wherein
   said second member has a protrusion extending axially, said protrusion connected with said intermediate plate in a relatively non-rotatably and axially movable manner.

8. A dampening disk assembly as set forth in claim 5, wherein
   said first member has a protrusion extending axially from said annular main body, said protrusion connected with a flange of said output hub in a relatively non-rotatably and axially movable manner.

9. A dampening disk assembly as set forth in claim 5, wherein
   said second member has a protrusion extending axially, said protrusion connected with said intermediate plate in a relatively non-rotatably and axially movable manner.

10. A dampening disk assembly as set forth in claim 8, wherein
   said second member has a protrusion extending axially, said protrusion connected with said intermediate plate in a relatively non-rotatably and axially movable manner.

* * * * *